(12) United States Patent
Ruth et al.

(10) Patent No.: US 12,514,514 B2
(45) Date of Patent: Jan. 6, 2026

(54) INTERACTIVE VITALITY MONITORING AND ANALYSIS SYSTEM

(71) Applicants: Alan Harris Ruth, Mount Albert (CA); Karl Giamov, Mount Albert (CA)

(72) Inventors: Alan Harris Ruth, Mount Albert (CA); Karl Giamov, Mount Albert (CA)

( * ) Notice: Subject to any disclaimer, the term of this patent is extended or adjusted under 35 U.S.C. 154(b) by 0 days.

(21) Appl. No.: 19/221,324

(22) Filed: May 28, 2025

(65) Prior Publication Data

US 2025/0325238 A1     Oct. 23, 2025

Related U.S. Application Data

(63) Continuation of application No. PCT/US2025/024591, filed on Apr. 14, 2025.

(30) Foreign Application Priority Data

Apr. 18, 2024   (CA) ..................................... 3235702

(51) Int. Cl.
*A61B 5/00*     (2006.01)
*A61B 5/11*     (2006.01)
*A61B 5/145*    (2006.01)
*G16H 40/67*    (2018.01)

(52) U.S. Cl.
CPC .......... *A61B 5/7275* (2013.01); *A61B 5/0022* (2013.01); *A61B 5/0024* (2013.01); *A61B 5/1118* (2013.01); *A61B 5/14532* (2013.01); *A61B 5/7264* (2013.01); *A61B 5/7445* (2013.01); *A61B 5/746* (2013.01); *A61B 5/7465* (2013.01); *G16H 40/67* (2018.01)

(58) Field of Classification Search
None
See application file for complete search history.

(56) References Cited

U.S. PATENT DOCUMENTS

| | | | |
|---|---|---|---|
| 2012/0179067 A1* | 7/2012 | Wekell | A61B 5/0022 600/587 |
| 2013/0245389 A1* | 9/2013 | Schultz | A61B 5/68 600/301 |
| 2016/0354039 A1* | 12/2016 | Soto | A61B 5/74 |

* cited by examiner

*Primary Examiner* — Fabricio R Murillo Garcia
(74) *Attorney, Agent, or Firm* — Knobbe Martens Olson & Bear LLP

(57) ABSTRACT

A system may store information about a user's condition in a standardized format in a set of one or more non-transitory storage devices, wherein the information about the user's condition represents a user activity pattern of a user; receive sensor data from a plurality of different sensors; update, by a computing system comprising one or more computer processors, the information about the user's condition in the standardized format based on analysis of the sensor data to generate updated information about the user's condition, wherein the updated information about the user's condition indicates a change in the user activity pattern of the user; store the updated information about the user's condition in the set of one or more non-transitory storage devices, and generate, by the computing system, a message comprising the updated information about the user's condition.

20 Claims, 19 Drawing Sheets

| Alert Generated | |
|---|---|
| Client Name | John Rogers |
| Sensor Type | H3 Tablet (*Missed*) |
| Alert Name | Missed-JB Weight |
| Alert Type | Alert_Critical |
| Alert Identifier | R9PTB02INAD |
| Device ID | JR H3 |
| Resolve Alert | ○ |

[Cancel] [Resolve Alert]

INTERACTIVE VITALITY MONITORING AND ANALYSIS SYSTEM

CROSS-REFERENCE TO RELATED APPLICATIONS

This application is a continuation of PCT/US2025/024591, filed Apr. 14, 2025, and titled "INTERACTIVE VITALITY MONITORING AND ANALYSIS SYSTEM," which claims priority to Canadian Patent Application No. 3,235,702, filed Apr. 18, 2024, and titled "SYSTEM AND METHOD OF OPTIMIZING HEALTH AND SAFETY OF ELDERLY CLIENTS IN A COMMUNITY SETTING," each of which is hereby incorporated by reference herein in their entirety.

BACKGROUND

Computer systems may use a sensor to monitor an individual user. Computer systems may allow the individual user to contact a caregiver when the sensor indicates that there is a health-or safety-related problem for the individual user.

SUMMARY

In some aspects, the techniques described herein relate to a patient monitoring and treatment method including: storing information about a user's condition in a standardized format in a set of one or more non-transitory storage devices, where the information about the user's condition represents a user activity pattern of a user; receiving sensor data from a plurality of different sensors, where individual sensors of the plurality of different sensors provide respective sensor data in a non-standardized format dependent on hardware or software used by the respective sensor; updating, by a computing system including one or more computer processors configured to execute specific instructions, the information about the user's condition in the standardized format based on analysis of the sensor data in one or more non-standardized formats to generate updated information about the user's condition in the standardized format, where the updated information about the user's condition indicates a change in the user activity pattern of the user; storing the updated information about the user's condition in the set of one or more non-transitory storage devices; automatically generating, by the computing system, a message including the updated information about the user's condition whenever updated information about the user's condition has been stored; and transmitting the message to one or more additional users over a computer network in real time, so that the one or more additional users have immediate access to up-to-date information about the user.

The patient monitoring and treatment method of the preceding paragraph can include any sub-combination of the following features: accessing additional sensor data from at least one of the plurality of different sensors, where the additional sensor data is generated at a time after the sensor data is received; and comparing the additional sensor data to the updated information about the user's condition to generate a comparison result, where the comparison result indicates a change in the user's condition is outside of an expected threshold, and where the message further includes the comparison result; determining, based on the comparison result, a user issue associated with the change in the user's condition; analyzing the user issue using a machine learning model to generate a response action; and executing the response action; where the response action includes transmitting an instruction to cause a user assistance device to provide a medication to the user; where first sensor data is received from a first sensor of the plurality of different sensors, where second sensor data is received from a second sensor of the plurality of different sensors, and where the first sensor data and the second sensor data are in different formats; where a first sensor of the plurality of different sensors is one of: a blood glucose monitor, a blood oxygen sensor, a blood pressure sensor, or a heart rate sensor; identifying a cohort associated with the user, where the cohort is associated with cohort information; comparing the updated information to the cohort information to generate a comparison result; determining, based on the comparison result, the updated information indicates the user's condition is outside of an expected range; identifying a response action based on the comparison result; and executing the response action; where identifying the response action includes: determining, based on applying the updated information as input to a machine learning model, a user issue; identifying a set of response actions associated with the user issue; and selecting the response action from the set of response actions based on the information about the user's condition and the updated information; where the user issue is a health-related issue; where the non-standardized format includes at least one of: an electrical waveform, timestamped sensor data, or unstructured sensor data.

In some aspects, the techniques described herein relate to a patient monitoring and treatment system including: a non-transitory computer-readable memory storing computer-executable instructions; and one or more processors configured to execute the computer-executable instructions to at least: store information about a user's condition in a standardized format in a set of one or more non-transitory storage devices, where the information about the user's condition represents a user activity pattern of a user; receive sensor data from a plurality of different sensors, where individual sensors of the plurality of different sensors provide respective sensor data in a non-standardized format dependent on hardware or software used by the respective sensor; update, by a computing system including one or more computer processors configured to execute specific instructions, the information about the user's condition in the standardized format based on analysis of the sensor data in one or more non-standardized formats to generate updated information about the user's condition in the standardized format, where the updated information about the user's condition indicates a change in the user activity pattern of the user; store the updated information about the user's condition in the set of one or more non-transitory storage devices; automatically generate, by the computing system, a message including the updated information about the user's condition whenever updated information about the user's condition has been stored; and transmit the message to one or more additional users over a computer network in real time, so that the one or more additional users have immediate access to up-to-date information about the user.

The patient monitoring and treatment system of the preceding paragraph can include any sub-combination of the following features: where the computer-executable instructions, when executed by the one or more processors, further cause the one or more processors to: access additional sensor data from at least one of the plurality of different sensors, where the additional sensor data is generated at a time after the sensor data is received; and compare the additional sensor data to the updated information about the user's condition to generate a comparison result, where the comparison result indicates a change in the user's condition is outside of an expected threshold, and where the message further includes the comparison result; determine, based on the comparison result, a user issue associated with the change in the user's condition; analyze the user issue using a machine learning model to generate a response action; and execute the response action; where the response action includes transmitting an instruction to cause a user assistance device to provide a medication to the user; identify a cohort associated with the user, where the cohort is associated with cohort information; compare the updated information to the cohort information to generate a comparison result; determine, based on the comparison result, the updated information indicates the user's condition is outside of an expected range; identify a response action based on the comparison result; and execute the response action; determine, based on applying the updated information as input to a machine learning model, a user issue; identify a set of response actions associated with the user issue; and select the response action from the set of response actions based on the information about the user's condition and the updated information; where the user issue is a health-related issue.

In some aspects, the techniques described herein relate to a non-transitory computer-readable medium encoded with instructions executable by a processor, the non-transitory computer-readable medium including instructions to: store information about a user's condition in a standardized format in a set of one or more non-transitory storage devices, where the information about the user's condition represents a user activity pattern of a user; receive sensor data from a plurality of different sensors, where individual sensors of the plurality of different sensors provide respective sensor data in a non-standardized format dependent on hardware or software used by the respective sensor; update, by a computing system including one or more computer processors configured to execute specific instructions, the information about the user's condition in the standardized format based on analysis of the sensor data in one or more non-standardized formats to generate updated information about the user's condition in the standardized format, where the updated information about the user's condition indicates a change in the user activity pattern of the user; store the updated information about the user's condition in the set of one or more non-transitory storage devices; automatically generate, by the computing system, a message including the updated information about the user's condition whenever updated information about the user's condition has been stored; and transmit the message to one or more additional users over a computer network in real time, so that the one or more additional users have immediate access to up-to-date information about the user.

The non-transitory computer-readable medium of the preceding paragraph can include any sub-combination of the following features: where the non-standardized format includes at least one of: an electrical waveform, time-stamped sensor data, or unstructured sensor data; where a first sensor of the plurality of different sensors is one of: a blood glucose monitor, a blood oxygen sensor, a blood pressure sensor, or a heart rate sensor.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIGS. 10-15 are illustrative examples of user interfaces for generating or interacting with a personalized companion according to some embodiments.

FIGS. 16-19 are illustrative examples of user interfaces for providing information related to an interactive vitality monitoring and analysis system according to some embodiments.

DETAILED DESCRIPTION

Figure 1:
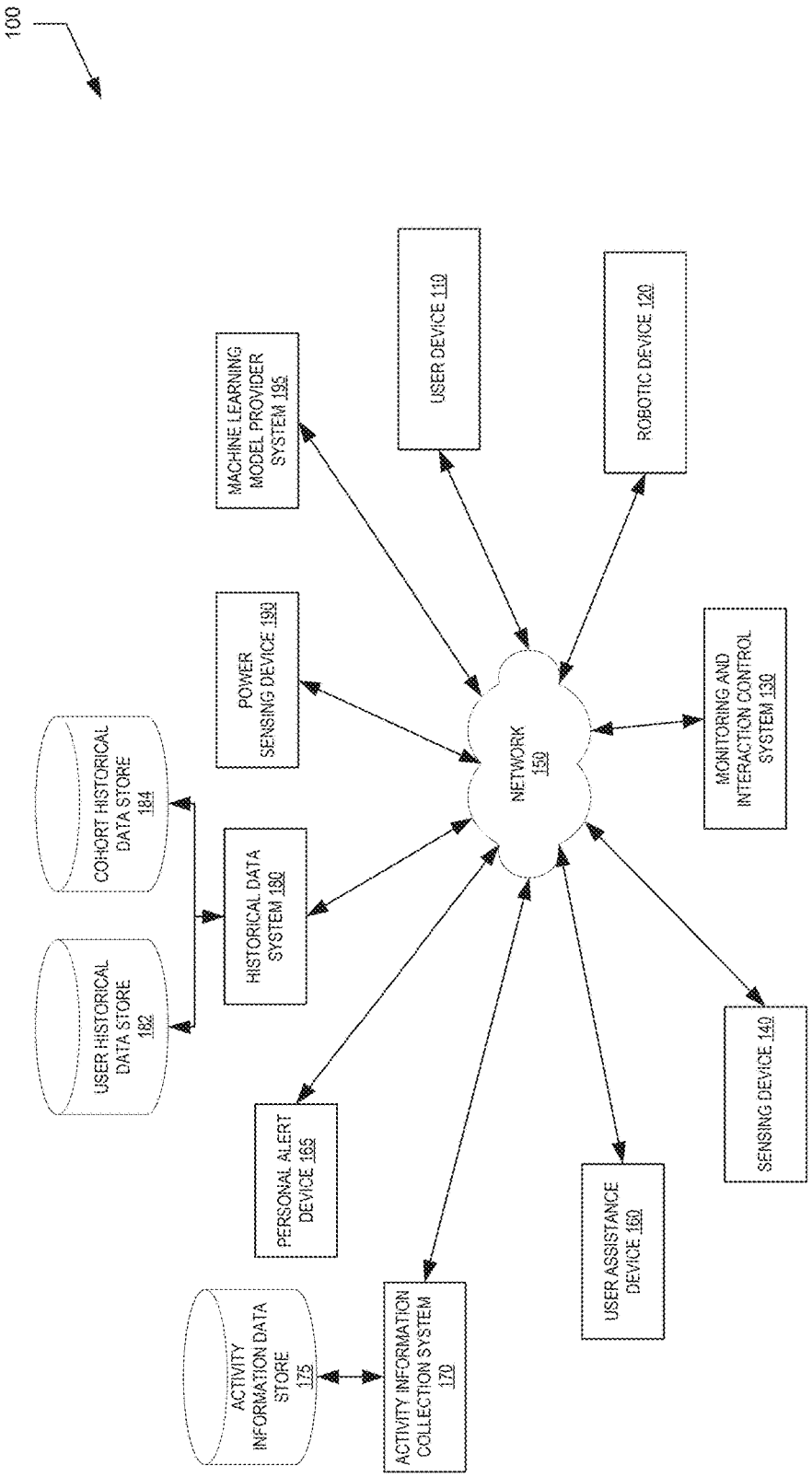
FIG. 1 is a block diagram of an illustrative operating environment for an interactive vitality monitoring and analysis system according to some embodiments.

The present disclosure relates to the monitoring, interaction, and care of individuals.

Some conventional systems allow for monitoring a user for a pre-existing disease or medical condition. For example, some systems allow for blood-glucose monitoring in a diabetic patient, tracking the location of a patient with a mental health disorder, or detecting sudden changes to the user's health or safety (e.g., detecting when the user may have fallen). Such systems may be limited to monitoring one, or a small subset of related, health or safety conditions for a user. However, many health or safety conditions are related to multiple factors that, when combined, lead to short and long-term effects on the user's overall health or safety. For example, an alert generated by a blood-glucose monitor may indicate a change in the user's blood-glucose levels, or may indicate that a blood-glucose value is outside of a safe threshold. Changes in blood-glucose levels can be caused by a variety of factors (e.g., medication adherence, medication timing, exercise, etc.), individually or in combination. However, conventional blood-glucose monitoring systems may not have access to information to enable analysis of these various factors affecting the user's blood-glucose levels.

Such a lack of access to additional information may limit the ability of conventional systems to provide insight into the causes of a detected health or safety issue. The lack of insight may limit the ability of a user, caregiver, medical practitioner, or other entity to assist the user in taking actions to reduce the likelihood of future negative health or safety events. Following the previous example of a blood-glucose monitor, knowing that the user's blood-glucose is outside of a safe range, on its own, may not allow the user to reduce the likelihood of the user's blood-glucose level moving outside of the safe range in the future. For example, the user may not have realized that they missed a dose of insulin earlier in the day, and as the blood-glucose monitor does not have access to medication use information, the user may not be provided information to assist them in remembering future insulin doses. Therefore, a lack of information that is available but not monitored by existing systems may limit the ability of such systems to assist a user in improving their health and safety in the future.

Some conventional systems may be directed to identifying or addressing acute health events (e.g., a heart attack, a fall, etc.). Such systems may detect the presence of an acute health event, and initiate a response to mitigate the effects of the acute health event when it occurs. By monitoring for acute health events, such systems may not be capable of assisting a user in preventing or minimizing a risk of the acute health event before the event occurs. However, in some cases acute health events may be predicable before the event occurs, and mitigation actions may be taken to minimize a risk of the acute health event occurring. Further, in some cases after an acute health event has occurred, options for medical intervention may be significantly more limited than before the event has occurred. Therefore, conventional systems that detect or address an acute health event after the event has occurred may provide a limited set of options to the user. For example, ensuring a user regularly exercises without overexertion may assist in reducing the likelihood of a heart attack. Further, prior to a heart attack, the user may have additional options for mitigating risk such as medication intervention, dietary changes, and the like. However, as conventional systems may detect when the heart attack is occurring, such conventional systems may not be capable of identifying information indicating that a heart attack may occur at a future time. Therefore, conventional systems may be limited in the types of assistance they can provide to the user, and may allow the user to experience a preventable acute health event.

Additionally, conventional systems that detect an acute health event may not be capable of identifying longitudinal changes in a user's health. The inability to identify longitudinal changes in the user's health may occur even where a conventional system has access to information that would be useful for identifying such a change. For example, a medication dispenser may determine that a user has missed a medication dose. However, such a medication dispenser may fail to identify a user's potential cognitive decline over time based on the user having missed several medication doses where the user previously had good medication adherence. Therefore, a user's decline in cognitive or physical health over time may not be identified by conventional systems. Further, conventional systems that detect an acute health event may not be capable of comparing information about the acute health event to other individuals in a similar condition to the user (e.g., in the user's cohort). The inability to compare the user to similarly situated others may result in the system failing to identify a potential health risk. For example, a system may monitor a user's blood pressure. The user's blood pressure may appear to be within a normal range for the user even though the average reading indicates a steady increase in the user's blood pressure where any individual reading does not indicate an acute blood pressure event. As the user's average reading value for blood pressure increases over time, the blood pressure monitoring system may fail to determine a risk of hypertension in the user that may have been identifiable by comparing the user's change in blood pressure values to those of other individuals in the user's cohort.

Some conventional systems will alert a caregiver or other entity when a negative health or safety event has occurred for a user. For example, a medication dispenser may alert a user's family member when a medication dose has been missed for a threshold amount of time. However, such systems may be limited in the information they can provide to mitigate the risk of future negative health or safety events. Following the previous medication dispenser example, the user may have missed their medication dose because the user has fallen out of bed and cannot move to request help. However, while the medication dispenser can alert the family member that the user has missed a medication dose, the medication dispenser may not have information to determine the cause of the missed medication dose. Therefore, the family member may not see the missed medication dose as an emergency requiring immediate attention (e.g., because the missed dose alone is unlikely to result in negative health consequences) and the user may remain in danger from the fall for an extended period of time.

Some systems allow for interaction between a user with limited social contacts or mobility (e.g., elderly, injured, etc.) to communicate with a person to allow for social engagement without the need for the user to travel or host a person in their home. However, such a person engaging with the user may not be trained to recognize signs of physical or mental decline, change in health status, or other indicators that the user should be provided additional assistance or connected with a health care provider. Further, the person interacting with the user may have limited time to interact with the user, or may have changes to their schedule that restrict the person's ability to interact with the user. Limited ability to engage with the user may lead to missed opportunities to assist the user or improve the user's well-being. For example, a person engaging with the user for only an hour every two weeks may not recognize signs of cognitive decline that may have been identifiable from more frequent, or extended, interactions.

Some systems provide a machine learning model, chatbot, or other computerized system capable of simulating interpersonal interactions with a user. Such systems may allow a user to interact with the user to simulate interpersonal interactions via an interface provided by the user's computing device. However, such systems may be limited in a variety of ways. One limitation of such systems may be that interactions are provided only via text. Text interactions may not simulate interpersonal interaction to a sufficient degree to assist the user in reducing loneliness caused by isolation. Further, text interactions with such systems may be challenging for some users, for example those with limited dexterity in one or both hands that may find text entry to be difficult. Some systems may attempt to address some limitations by providing an image of a person the user can imagine they are interacting with, however such a system may instead serve to remind the user that they are interacting with a "fake" person via the system interface, for example due to the image being a stationary unchanging image.

Additionally, existing simulated interpersonal interaction systems may not be capable of simulating the aspects of a real person related to having memory of past life events. For example, when conversing with a real person, the real person may relate parts of a conversation to previous events in the real person's life (e.g., having visited a city, studied a subject in school, learned an instrument, etc.). However, current simulated interpersonal interaction systems may not allow for the conversational software to simulate having a memory of past life events, limiting the ability of the system to naturally converse with the user.

Some aspects of the present disclosure address some or all of the issues noted above, among others, by providing for consolidation and analysis of user information from a variety of sources to allow for holistic analysis of a user issue and the generation of a response action to assist the user in addressing the user issue. Such an analysis, using sensor information and additional information associated with a user, may allow the system of the present disclosure to understand a current state of a user (e.g., a point in time state of the user) and identify long-term changes that may be indicative of potential future user issues. For example, a blood glucose monitor may generate blood glucose level information for a user. A camera for food logging system may generate food consumption information for the user. A monitoring and interaction system may receive the blood glucose level information and the food consumption information, and based on the combined information determine that a change to the user's diet may assist in managing spikes in blood glucose levels. Further, the monitoring and interaction system may determine specific response actions (e.g., replace a high-sugar drink with a sugarless drink at lunch) that may be performed by the user, a caregiver, a medical professional, or another system to address a user's issue. Advantageously, while the change to the user's diet that may address a spike in blood glucose levels may not have been determinable from the food consumption information or the blood glucose information alone, the monitoring and interaction system may analyze this related information to assist the user in a holistic manner. Further, the blood glucose monitor information may be compared over time, and based on different dietary changes, to allow for a determination that a user's medication is no longer adequately stabilizing the user's blood glucose levels. The system of the present disclosure may then generate a recommendation for a healthcare provider to adjust the user's medication dosage, medication type, or dietary recommendations.

Advantageously, systems of the present disclosure may be flexibly designed to allow for the addition, change, or removal of sensors or systems in communication with the system. The sensors or systems in communication with the system may provide information in a variety of formats (e.g., electrical waveforms, determined values, structured data objects, unstructured data objects, timestamped information, etc.). The format of information provided by one sensor or system may differ from the format of information provided by a different sensor or system. Further, even if two sensors generate the same type of sensor information (e.g., heart rate, SpO2, blood glucose, location, acceleration, etc.) the sensor information may be in different formats (e.g., a first vendor may use a proprietary format and a second sensor may use an open format). The system of the present disclosure then, advantageously, may process the information in each of the different formats to generate a unified data format or data structure representing information about individual users of the system. The combination of disparate sensor information that may arrive in one or more non-standardized formats into a unified data structure (e.g., a user activity pattern, a common sensor information format, etc.) that may be associated with a user provides an improvement in the field of computer technology generally by allowing for more efficient access to, and use of, sensor information. Capabilities provided by the present disclosure to process sensor information in different formats may reduce the computation (e.g., processing by a CPU) required to derive useful insights from the sensor information, and advantageously allow for additional sensor information to be processed when compared to previous systems.

Following the previous example of a blood glucose sensor and a food logging system, a conversational artificial intelligence (AI) system (e.g., based on a large language model (LLM)) may be added to communication with the monitoring and interaction system. The conversational AI system may interact with the user and receive information indicating the user experiences an upset stomach from a certain type of sugarless drink, which is preventing the user from making the recommended diet change provided previously. The monitoring and interaction system may then generate an updated response action that instructs the user, caregiver, medical professional, or other system to provide the user with an alternative sugarless drink that may not cause the user to experience an upset stomach. Integrating disparate information to generate response action recommendations in such a manner may advantageously reduce the computing resources required to assist a user by more efficiently processing user information to generate the response action.

Some aspects of the present disclosure identify risk factors for a health event (e.g., a heart attack, stroke, fall, injury related to dementia, etc.) from user information to generate response actions to reduce the risk of the health event occurring. Response actions may include, for example, at least one of determining or providing a treatment associated with the health event to a user, contacting a health care provider, contacting a trusted contact, causing a robotic device to locate the user, causing a robotic device to assist the user (e.g., by providing a medication), taking no action and waiting for additional information, and the like. The monitoring and interaction system may collect various information types related to a user over time. The monitoring and interaction system may compare the user information at different points in time to identify long-term (e.g., longitudinal) changes in the user's activity, physical health (e.g., blood pressure, heart rate, blood oxygenation, time awake, time asleep, weight, height, gait, etc.), or psychological health. Further, user information may be compared to cohort information (e.g., anonymized health or activity information for similarly situated users) to identify potential risks to the user. Advantageously, by identifying a risk of a health event before the acute stage of the health event, response actions may be suggested to the user, caregiver, medical professional, or another system to limit the risk or future damage of the health event.

Some aspects of the present disclosure provide for generating a personalized companion simulating a real or fictional person to interact with a user. Advantageously, the personalized companion may be available to the user at any time of day, or in any location, the user would like to have a social interaction. Additionally, the personalized companion may analyze the user's responses or requests to determine a physical or psychological issue of the user. For example, the personalized companion may analyze a user response to determine the user is tired and should return home from a walk or call a taxi to assist in returning home. In another example, the personalized companion may perform a mood analysis on user responses to determine the user is experiencing an episode of depression. The personalized companion may then adjust responses provided to the user in order to guide the user's mood, or prevent deterioration of the user's psychological health until further assistance can be provided. Additionally, the personalized companion may be capable of executing a diagnostic program (e.g., causing the user to respond to questions from a psychological diagnostic test, having the user execute a set of movements that may be monitored to identify a muscular problem, etc.), to assist in diagnosing a user. The personalized companion may provide information to a caregiver or medical professional to aid in diagnosis and treatment of the user. Advantageously, the personalized companion can provide immediate, real-time assistance to a user in situations where a caregiver or medical professional may not be available. Further, the personalized companion can request assistance for the user in situations where the user does not realize assistance may be needed (e.g., during an episode of dementia), or where the user is not capable of requesting assistance (e.g., following a fall).

Further, the generation and simulation of the personalized companion represents an improvement in underlying computer technology. For example, the present disclosure provides for more efficient diagnosis of, and response to, user issues based on user responses or sensor information, reducing the computing time and processing requirements for providing such diagnosis or response. The present disclosure provides such an improvement, for example, by combining information from various disparate sources that may include information in one or more non-standardized formats into unified data structures (e.g., a user activity pattern, a personality or persona for the personalized companion, etc.) associated with the user that may be more efficiently accessed and processed by a machine learning model to communicate, diagnose, and assist the user. In some embodiments, the unified data structures may be in a standardized format. In some embodiments, the information associated with the user from the disparate sources may remain in the non-standardized formats and may instead be structured in a manner allowing efficient access to the information without the need for conversion between structures.

Certain aspects and implementations are discussed herein with reference to use of a machine learning (ML) model, those aspects and implementations may be performed by any other artificial intelligence (AI) model, generative AI model, generative model, neural network (NN), deep-learning NN, multimodal model, and/or other algorithmic processes. Examples of models that may be used in various implementations of the present disclosure include, for example, feed-forward NNs, NNs having one or more fully connected layers, graph neural networks (GNNs), Bidirectional Encoder Representations from Transformers (BERT), and the like.

Various aspects of the disclosure will be described with regard to certain examples and embodiments, which are intended to illustrate but not limit the disclosure. Although aspects of some embodiments described in the disclosure will focus, for the purpose of illustration, on particular examples of machine learning models, information modalities, and the like, the examples are illustrative only and are not intended to be limiting. In some embodiments, the techniques described herein may be applied to additional or alternative types of machine learning models, information modalities, and the like. Additionally, any feature used in any embodiment described herein may be used in any combination with any other feature or in any other embodiment, without limitation.

Example Monitoring and Interaction Analysis Environment

With reference to an illustrative example, FIG. 1 shows an illustrative environment 100 for providing monitoring of, and interaction with, a user of an interactive vitality monitoring and analysis system. The environment 100 of this example includes a user device 110, a robotic device 120, a monitoring and interaction control system 130, a sensing device 140, a network 150, a user assistance device 160, an activity information collection system 170, a personal alert device 165, a historical data system 180, a power sensing device 190, and a machine learning model provider system 195. In some embodiments, one or more of the computing systems described in relation to illustrative environment 100 may communicate with the various devices, or other computing systems, using a local network that may be associated with, or under the control of, the user being monitored. Use of a local network for at least a portion of the communications between systems and device may enable additional security for health information or other personal information of the user.

The user device 110 may be a computing device associated with a user being monitored by, or interacting with, the monitoring and interaction control system 130. For example, the user device 110 may be a laptop, mobile phone, smartphone, or other computing device with which the user may interact. The user device 110 may include a display, speaker, motor (e.g., for providing haptic feedback), or other element allowing the user device 110 to provide information to the user. The user device 110 may include a keyboard, touchscreen display, microphone, accelerometer, or other element allowing the user to provide input to the user device 110. In some embodiments, the user device 110 may include, or be in communication with, additional sensors that may provide information for monitoring the user. For example, the user device 110 may include, or be in communication with, a location sensor (e.g., a GPS of the user device 110), a camera, or other sensor configured to capture information associated with the user.

The robotic device 120 may be a stationary or mobile robot configured to collect information associated with a user being monitored by the monitoring and interaction control system 130. In some embodiments, the robotic device 120 may include a camera to capture image information for a user or a location associated with the user. For example, the robotic device 120 may be mobile and may traverse an area to locate a user, where the user is located when image information captured by the camera of the robotic device 120 is determined to include the user. In another example, the robotic device 120 may be directed to a location where a sensing device 140 indicates a possible issue in order to confirm the presence of the issue indicated by the sensing device 140. Examples of potential issues include a stove being left on, a door being left open, excessive water usage (e.g., from a tap being left on), flooding, fire, an intruder, and the like. Issues may be detected, for example, by various sensors of the robotic device 120 described in further detail below. The robotic device 120 may process the sensor information locally (e.g., using an on-board computing system) or may provide the sensor information to the monitoring and interaction control system 130 for processing and receive information about a detected issue in response. In some embodiments, the robotic device 120 may determine a response action (e.g., moving to a location, providing medication to a user, adjusting a camera to view an object or user, etc.) in response to the detected issue.

In some embodiments, the robotic device 120 may be configured to interact with the user. The robotic device 120 may include input and output elements to enable user interaction with a personalized companion. For example, the robotic device 120 may include a display for presenting an image of the personalized companion or text messages from the personalized companion, a speaker for playing speech generated for the personalized companion, or a microphone for generating voice information from an utterance of the user. In such embodiments, the robotic device 120 may act to embody the personalized assistant, and may allow the personal assistant access to additional functions outside of direct interaction with the user and access to previously-collected information. For example, the embodied personalized assistant may interact with the environment to locate objects, check on the condition of an object or user, move an object, or lead the user to a location.

The monitoring and interaction control system 130 may be configured to enable the monitoring of a user. The monitoring and interaction control system 130 may be configured to provide functionality to enable interactions between the user and various devices (e.g., the user interaction device 160, personal alert device 165, power sensing device 190, or other device). Additionally, the monitoring and interaction control system 130 may receive disparate sensor information from the sensing devices 140 that may be in different formats. The monitoring and interaction control system 130 may process the sensor information in each of the different formats to generate a unified data structure (e.g., a user activity pattern) associated with a user, or compare the sensor information to previously-received sensor information that may be in a different format. Based on the analysis and comparison of sensor information received in the different formats, the monitoring and interaction control system 130 may generate a response action addressing a user issue. The monitoring and interaction control system 130 may provide access to a personalized companion, as described in further detail below herein. The monitoring and interaction control system 130 is further described in relation to FIG. 2 herein.

The sensing device 140 may be a sensor configured to provide information about a user to the monitoring and interaction control system 130. Examples of a sensing device include a door sensor (e.g., contact sensor, Hall effect sensor, etc.), a motion or activity sensor (e.g., infra-red sensor, ultrasound sensor, acoustic sensor, LIDAR sensor, image sensor, camera, etc.), an electrical sensor (e.g., a current sensor), a physiological sensor (e.g., respiration sensor, heart rate sensor, pulse oximeter, spirometry device, blood glucose monitor, blood pressure device, weight sensor, breath analysis device, waste material composition sensor, etc.), incontinence sensor, pressure sensor, and the like. In some embodiments, the sensor information acquired by the sensing device 140 may undergo further processing, for example by the sensing device 140 or the monitoring and interaction control system 130, in order to determine additional information. For example, the image information acquired by a camera may be analyzed to determine a gait of the user. The gait of the user may then be compared to previously-acquired gait information to identify changes in the user's gait. In another example, image information from a camera may be analyzed to assess the user's mood. As described in further detail below herein the user's mood may be provided as input to a personalized companion to aid in directing a conversation between the user and the personalized companion. Additionally, the user's mood may be used by the monitoring and interaction control system 130 to assess short-or long-term changes in the user's psychological health.

Further, as discussed above herein, a first sensing device 140 may provide sensor information in a first format, and a second sensing device 140 may provide sensor information in a second format different from the first format. The format of the sensor information may be different between two sensing devices 140 even where the two sensors are of a same sensor type (e.g., heart rate sensor, SpO2 sensor, blood glucose sensor, location sensor, etc.). The monitoring and interaction control system 130 may receive the sensor information from each sensing device 140 in the format associated with the respective sensing device 140 and generate output based on the sensor information by comparing the sensor information to a unified data structure associated with a user (e.g., a user activity pattern), sensor information from a different sensor, stored information associated with other users or people generally (e.g., cohort information) and the like. Processing the sensor information by the monitoring and interaction control system 130 may result in a treatment recommendation, cause a robotic device robotic device 120 or user assistance device 160 to administer a treatment or provide assistance to a user, contact a health provider or caregiver, or to wait for or access additional sensor information to further evaluate a user's condition.

The network 150 may be a publicly-accessible network of linked networks, some or all of which may be operated by various distinct parties, for example the Internet. In some cases, network 150 may include a private network, personal area network, local area network, wide area network, cellular data network, satellite network, etc., or some combination thereof, some or all of which may or may not have access to and/or from the Internet.

The user assistance device 160 may be a device in communication with the monitoring and interaction control system 130 that assists the user in addressing a health-related issue. A health-related issue may be a physical issue (e.g., mobility issue, illness, injury, incontinence, constipation, etc.) or psychological issue (e.g., depression, anxiety, etc.). For example, the user assistance device 160 may be a medication dispensing or medication adherence device that automatically dispenses a prescribed medication to the user at an assigned time. In another example, the user assistance device 160 may be a motorized wheelchair, or other mobility aid, that can be directed by the monitoring and interaction control system 130 to a user location (e.g., by a motor of the user assistance device 160, or by the robotic device 120 moving the user assistance device 160) in order to improve the user's mobility. In a further example, the user assistance device 160 may be a motorized device for food distribution, that can be directed by the monitoring and interaction control system 130 to move to a user location (e.g., by a motor in a user assistance device 160, or by instructing a robotic device 120 to move the user assistance device 160) in order to assist a user in accessing a meal.

The personal alert device 165 may be a wearable communication or sensing device, as described in further detail with respect to FIG. 3 below herein.

The activity information collection system 170 is a computing system used by the monitoring and interaction control system 130 to store and provide access to activity information associated with a user. The activity information collection system 170 of this illustrative environment 100 is in communication with an activity information data store 175.

The activity information data store 175 is a storage location of the activity information collection system 170 used to store activity information associated with a user and collected by systems and devices of the illustrative environment 100, or accessed from additional systems where user information may be stored (e.g., medical records, school records, a user's schedule, etc.). As with all data stores described herein, the activity information data store 175 may be a secure data storage location, storing activity information in an obfuscated format (e.g., encrypted, modified to remove personally identifiable information, etc.). In some embodiments, access to data stored by the activity information data store 175 may be restricted, in either obfuscated or unobfuscated form, to devices or systems communicating with the activity information data store 175 over a secure network (e.g., a virtual private network, local area network, etc.).

The historical data system 180 is a computing system for providing historical user data, or historical data generally, for use by the monitoring and interaction control system 130 in assessing or predicting a user's condition or needs. The historical data system 180 of this illustrative environment 100 is in communication with a user historical data store 182 and a cohort historical data store 184.

The user historical data store 182 is a storage location for storing historical user data. Historical user data may include, for example, a medical chart, a medical history, a medication history, a list of current medications being used by the user, a medical provider, a pharmacy, a family medical history, or any medical, health, or other information available from the user or another source.

The cohort historical data store 184 is a storage location storing cohort information. Cohort historical data may include available medical, health, or safety information associated with an identifier useful for determining whether the medical information is associated with a particular cohort. For example, an identifier to associate medical information with a particular cohort may include an age, a socioeconomic status, an educational level or degree attained, a salary, a location of residence, a location of birth, and the like.

The power sensing device 190 is a monitoring device that may be connected to a power connection of a device, room, or structure associated with a user. The power sensing device 190 may include a current sensor, or other sensor, that may be used to determine an amount of power used by the device, room, or structure to which the power sensing device 190 is connected. The power sensing device 190, or the monitoring and interaction control system 130, may use the power use information generated by the power sensing device 190 to determine a user activity or device status. For example, the power sensing device 190 may be connected to a refrigerator associated with the user, and power information generated by the power sensing device 190 may be used to determine when the refrigerator has been opened or left open. In some embodiments, the power sensing device 190 may generate an alert in response to power information indicating a change in expected power usage (e.g., a change in current power usage compared to expected power usage based on historical power use information).

The machine learning model provider system 195 is a computing system from which the monitoring and interaction control system 130 may access or request one or more machine learning models. The machine learning model provider system 195 may be a third-party provider system that allows access to various types of trained, or untrained, machine learning models. For example, the machine learning model provider system 195 may provide access to a vision model, large language model, neural network, trained psychological analysis model, untrained voice information generation model, and the like. The machine learning model provider system 195 may provide access to a consensus model, or allow the monitoring and interaction control system 130 to access a plurality of models to generate a consensus model. A consensus model, as used herein, may refer to using multiple copies of the same machine learning model, or multiple different machine learning models, to generate a plurality of results. The monitoring and interaction control system 130 may then select a result based on an average response value, most common response, agreement with an existing expert consensus (e.g., comparing a result from a machine learning model to a result in an existing medical literature), or other metric. In some embodiments, the machine learning model provider system 195 may provide an orchestrator model that is configured to manage a set of machine learning models, where different machine learning models in the set of machine learning models perform different functions (e.g., text generation, image generation, video generation, etc.). Machine learning models provided by the machine learning model provider system 195 may be executed on the machine learning model provider system 195. Alternatively, a machine learning model provided by the machine learning model provider system 195 may be executed on the monitoring and interaction control system 130. In some embodiments, the monitoring and interaction control system 130 may be a machine learning model provider system 195, and may provide access to various trained or untrained machine learning models for use in assisting different users.

Example User Environment

Figure 2:
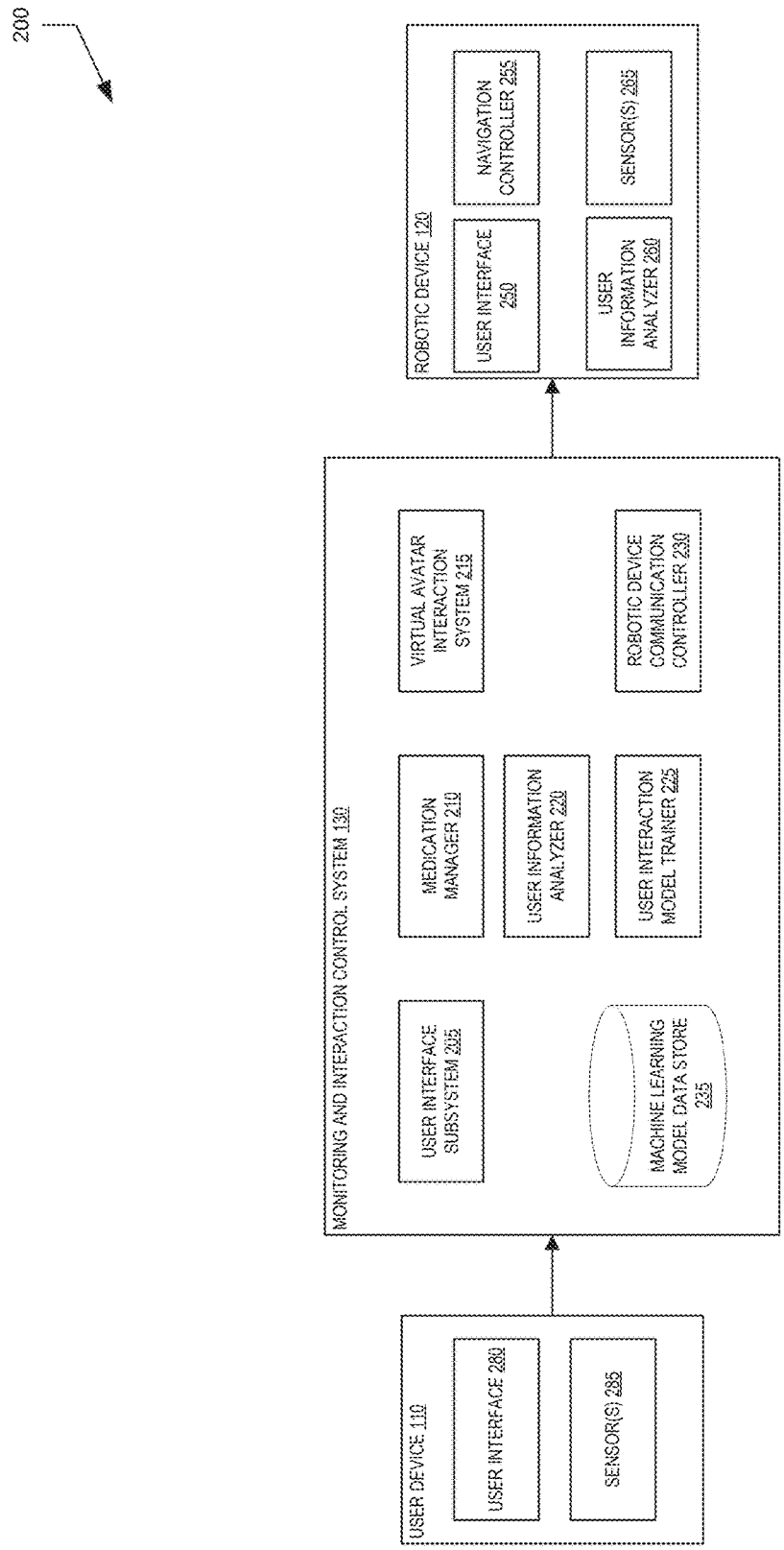
FIG. 2 is a block diagram of an illustrative monitoring and interaction control system according to some embodiments.

FIG. 2 is an example user environment 200 including a monitoring and interaction control system 130, a user device 110, and a robotic device 120.

The user device 110 of this example user environment 200 may be the user device 110 as described previously herein with respect to FIG. 1. The user device 110 of this user environment 200 includes a user interface 280, and one or more sensors 285. The user interface 280 may include the ability to provide output to the user, or receive input for the user. For example, the user interface 280 may include a display (e.g., an LED display, a touchscreen display, etc.), a keyboard, a mouse, a camera, a microphone, or a speaker. The one or more sensors 285 may include, for example, an accelerometer, camera, microphone, or any of the sensors described above herein as a sensing device 140.

The monitoring and interaction control system 130 of this example user environment 200 may be the monitoring and interaction control system 130 described previously herein with respect to FIG. 1. The monitoring and interaction control system 130 includes a user interface subsystem 205, a medication manager 210, a user information analyzer 220, a user interaction model trainer 225, a virtual avatar interaction system 215, a robotic device communication controller 230, and a machine learning data store 235.

The user interface subsystem 205 generates user interface information to allow for interactions between a user and the monitoring and interaction control system 130. For example, the user interface subsystem 205 may generate the user interfaces described below with respect to FIGS. 10-19. In some embodiments, the user interface subsystem 205 and the virtual avatar interaction system 215 may operate to generate an interface for a personalized assistant, or virtual guide, for the user.

The medication manager 210 accesses medication information associated with a user to assist the user in regular use of prescribed medications. For example, the medication manager 210 may transmit a medication alert to the user (e.g., via the user device 110 or robotic device 120) to indicate to the user that it is time to take a medication. The medication alert may indicate a type of medication, a dose of medication, additional supplies associated with use of a medication (e.g., a hypodermic needle), a location where medication is stored, a set of steps for administering a medication, and the like. In some embodiments, the medication manager 210 may be in communication with a user assistance device 160 that dispenses medication to the user. In such embodiments, the medication manager 210 may cause the user assistance device 160 to dispense the medication. In some embodiments, the user assistance device 160 communicates with the monitoring and interaction control system 130 to issue alerts to an individual that is assisting the user or monitoring the user's safety such as a caregiver, medical professional, or family member, when a dose of medication is missed by a user. The alert may, for example, cause initiation of a follow-up action (e.g., causing a robotic device 120 to locate the user, providing a location of the user to a caregiver, etc.). Further, the user assistance device 160 may provide the medication to the user, for example by assisting the user in moving to a medication dispenser, or causing a device (e.g., the robotic device 120) to bring the medication to the user.

The virtual avatar interaction system 215 enables the generation and use of a personalized companion or virtual guide as described below with respect to FIGS. 6-8, and 10-15. The virtual avatar interaction system 215 may access one or more machine learning models, for example from the machine learning model provider system 195, to enable various functions of the personalized companion or virtual guide.

The user information analyzer 220 generates, updates, or otherwise modifies a user activity pattern, for example as described below with respect to FIG. 5. The user information analyzer 220 may access information to be analyzed from any of the user device 110, robotic device 120, sensing device 140, user assistance device 160, activity information collection system 170, personal alert device 165, historical data system 180, or power sensing device 190. The user information analyzer 220 may then generate a user activity pattern representing expected activities of a user based at least in part on previous user activity, or cohort information. The activity pattern may be used to determine anomalies in user activities for which an alert should be generated. For example, the user's activity pattern may indicate the user generally sleeps until 7:00 AM. The monitoring and interaction control system 130 may then receive an indication from a sensing device 140 that the user is moving at 4:30 AM, and determine the user motion at that time is anomalous. The user information analyzer 220 may then generate an alert indicating unusual activity by the user, and transmit the alert to a caregiver, healthcare provider, or other system or user. In some embodiments, the user information analyzer 220 may use a machine learning model to generate or analyze the user activity pattern. Further, the user activity pattern may include physiological or psychological health information for the user. For example, the user activity pattern may include a resting heart rate for the user, a heart rate for the user under exertion, a blood glucose level, a mood when performing an activity, and the like. Health information for the user included in the user activity pattern may be associated with a time. For example, if the user generally sleeps between 10:00 PM and 5:00 AM, a heart rate while sleeping for these hours may be included in the user activity pattern.

The user interaction model trainer 225 may train a machine learning model for use by the virtual avatar interaction system 215. The user interaction model trainer 225 may access an untrained or trained model from the machine learning model provider system 195. The user interaction model trainer 225 may then use information received by, or accessed by, the monitoring and interaction control system 130 to train or modify a machine learning model to perform a function of the user information analyzer 220, virtual avatar interaction system 215, or other aspect of the monitoring and interaction control system 130 for which a machine learning model may be used.

The robotic device communication controller 230 may be used to control communications between a robotic device 120 and the monitoring and interaction control system 130. For example, the robotic device communication controller 230 may provide image, text, audio, or other information to enable the robotic device 120 to display a personalized companion generated by the virtual avatar interaction system 215 to the user. Further, the robotic device communication controller 230 may receive information resulting from interactions between the user and the personalized companion provided by the robotic device 120. In another example, the monitoring and interaction control system 130 may determine that a user's stove has been left on (e.g., based on power information received from the power sensing device 190). The robotic device communication controller 230 may then generate and transmit instructions to the robotic device 120 to cause the robotic device 120 to go to the location of the user's stove and take a picture of the stove using a camera of the robotic device 120. The robotic device communication controller 230 may then receive the image information generated by the robotic device 120 and provide the image information to the monitoring and interaction control system 130 to allow the monitoring and interaction control system 130 to determine whether the stove is on. In another example, the robotic device communication controller 230 may generate instructions to cause the robotic device 120 to locate the user within the user's home.

The machine learning data store 235 is a storage location used to store information related to a machine learning model used by the monitoring and interaction control system 130. For example, the machine learning data store 235 may store a trained machine learning model, a local copy of a machine learning model accessed from the machine learning model provider system 195, a set of weights to be applied to a machine learning model, a vector database storing searchable information for access by a machine learning model (e.g., a database containing embeddings representing a user's activity patter), and the like.

The robotic device 120 of this example user environment 200 may be a mobile robotic device comprising a computing system, for example as described previously herein with respect to FIG. 1. The robotic device 120 of this example user environment 200 includes a user interface 250, a navigation controller 255, an user information analyzer 260, and one or more sensors 265. However, a robotic device 120 in additional embodiments may comprise different elements, or additional elements (e.g., a motorized arm, telescopic camera mount, second user interface, etc.) to perform additional functions to assist a user.

The user interface 250 may allow a user, caregiver, medical provider, or other individual to interact with the robotic device 120. The user interface 250 may include an input device. For example, the input device may be or include a microphone, a keyboard, a touchscreen display, a mouse, and the like. The user interface 250 may an output device. For example, the user interface 250 may be or include a speaker, a display, a light emitting diode (LED), and the like. Information for the user interface (e.g., information to cause display of an interactive graphical user interface) may be generated at least in part by the robotic device 120 or the user interface subsystem 205 of the monitoring and interaction control system 130. The user interface 250 may allow a user to interact with a personalized companion (e.g., a personalized companion provided by the virtual avatar interaction system 215), for example as described in further detail with respect to FIG. 7 below herein.

The navigation controller 255 generates or executes navigation instructions for the robotic device 120. In some embodiments, the navigation instructions may be received by the robotic device 120 from the robotic device communication controller 230. In some embodiments, the navigation instructions may include control instructions for an actuator or motor of the robotic device 120 to cause the actuator or motor to execute a movement. In further embodiments, the navigation controller 255 may receive an instruction to perform an action (e.g., move a robotic arm of the robotic device 120, move the robotic device 120 to a location, etc.). The navigation controller 255 may generate control instructions for an actuator or motor of the robotic device 120 to cause the robotic device 120 to perform the action. Additionally, the navigation controller 255 may provide localization and mapping functions for the robotic device 120 to determine a current position of the robotic device 120, or plan a route for the robotic device 120 to a destination. In additional embodiments, the navigation controller 255 may receive an instruction from the virtual avatar interaction system 215 and generate navigation and control instructions to cause the robotic device 120 to perform an action based on the instruction received from the virtual avatar interaction system 215.

The one or more sensors 265 of this example robotic device 120 generate sensor information for the robotic device 120 or the monitoring and interaction control system 130. The one or more sensors 265 may include an image sensor (e.g., a camera), LIDAR sensor, accelerometer, tachometer, inertial measurement unit, or other sensor to generate information for that may be used, at least in part, to assist in navigation of the robotic device 120 by the navigation controller 255. Sensor information generated by a sensor of the one or more sensors 265 for navigation may additionally be used for monitoring and analysis of a user of the monitoring and interaction control system 130. Further, the personal alert device 165 may include a sensor as described above with respect to the sensing device 140 to generate sensor information. In some embodiments, at least a portion of the sensor information generated by the one or more sensors 265 may the processed locally by the robotic device 120. In some embodiments, the sensor information generated by the one or more sensors 265 may be transmitted to the monitoring and interaction control system 130 for processing by the monitoring and interaction control system 130.

The user information analyzer 260 may process information associated with a user, or an environment associated with the user, to generate user analysis information. User analysis information may include, for example, a location of the user, a status of an appliance or fixture of the user's environment (e.g., an indication a stove is on, a door is open, a light is off, a bathtub is flooding, etc.), a movement speed of the user, a gait of the user, or information associated with the user or the user's environment that may be determined from sensor information received from the one or more sensors 265. Status of a user's environment may be determined based on various sensing devices 140. For example, power, temperature, or gas sensors may be used to determine when an appliance is left on, image information from an image sensor (e.g., a camera in the a room, a camera of the robotic device 120, etc.) may determine whether a switch, knob, or other control element for a device is in an on or off position, a flow sensor or other liquid sensor may determine a tap has been left on or that a leak is occurring, audio information from an acoustic sensor may be used to determine a door is open (e.g., based on wind noise in the generated audio information), a fire alarm is active, or something is moving between areas of a home. The preceding examples are illustrative, it should be understood that while each determination is discussed with respect to a particular information or sensor type, the user information analyzer 260 may use information from different sensors provided in different formats to determine information about the user's environment.

Information used to generate the user analysis information may be generated by the robotic device 120 (e.g., by the one or more sensors 265), or received from another computing system (e.g., the monitoring and interaction control system 130 or user device 110). In some embodiments, the user information analyzer 260 may implement a machine learning model to generate user analysis information. For example, a machine learning model may be used to identify an object in a user's home. The one or more sensors 265 may then determine, based on previously received information, whether the object has moved. In another example, a machine learning model may be used by the user information analyzer 260 to convert a user utterance to text and identify a keyword in the user's utterance. In this example, the keyword may be related to a physical, psychological, or other problem the user is experiencing. The user information analyzer 260 may generate a response action based on the generated user analysis information. Examples of a response action the user information analyzer 260 may generate include presenting a prompt to the user via the user interface 250 to request an input from the user (e.g., cause a speaker of the user interface 250 to request the user count to 10 and then receive audio information generated by the user counting to 10 via a microphone of the user interface 250), transmitting a request for further analysis and at least a portion of the user analysis information or sensor information to the monitoring and interaction control system 130, causing the virtual avatar interaction system 215 to initialize to interact with the user, causing the robotic device 120 to move to a specific location, causing the robotic device 120 to provide an item (e.g., a medication packet, an assistive device, etc.) to the user, or other actions that may assist the user.

Example Personal Alert Device

Figure 3:
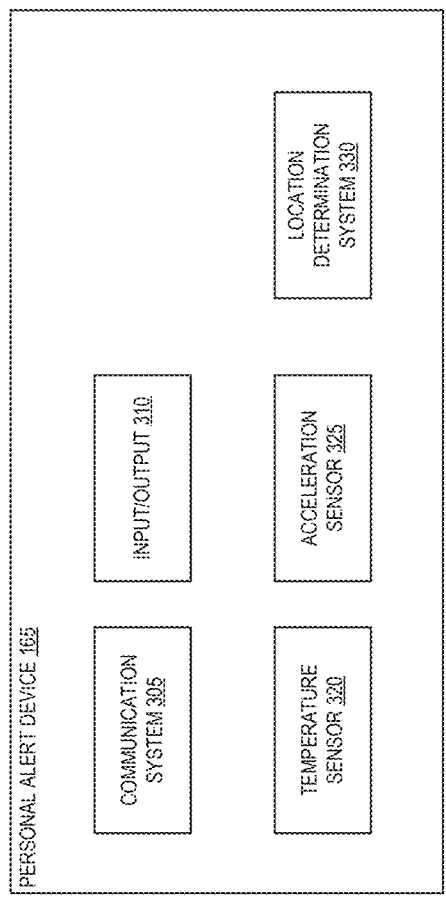
FIG. 3 is a block diagram of an illustrative pendant device according to some embodiments.

FIG. 3 is a block diagram of an example personal alert device 165 according to some embodiments. The personal alert device 165 of this example includes a communication system 305, an input/output 310, a temperature sensor 320, an acceleration sensor 325, and a location determination system 330. While certain examples described below related to generating an alert or alert message will be discussed with respect to the personal alert device 165, it should be understood that, in some embodiments, the monitoring and interaction control system 130 may generate the alert or alert message based on information received from the personal alert device 165. Further, in response to an event causing the personal alert device 165 to generate an alert, the personal alert device 165 may communicate with the user associated with the personal alert device 165 (e.g., by the input/output 310) to determine whether an alert message will be transmitted. For example, the personal alert device 165 may cause a speaker of the input/output 310 to play a message requesting the user press a button of the input/output 310 to indicate the user is safe, or otherwise does not need assistance. In another example, the personal alert device 165 may cause a speaker of the input/output 310 to play a message requesting the user press a button of the input/output 310 to request assistance.

The communication system 305 allows for communication between the personal alert device 165 and external devices or networks, for example via the network 150. For example, the communication system 305 may be a cellular communication system communicating with a cellular network (e.g., LTE, GSM, satellite, etc.). The communication system 305 may receive information for the personal alert device 165. For example, the communication system 305 may receive audio information, video information, and the like sent to the personal alert device 165. The communication system 305 may transmit information generated or received by the personal alert device 165, for example voice information received via the input/output 310, a request for assistance (e.g., generated in response to information from the acceleration sensor 325 indicating a potential fall, a user of the personal alert device 165 pressing an emergency button of the input/output 310, etc.), temperature information captured by the temperature sensor 320, or a location determined by the location determination system 330. In some embodiments, the communication system 305 may be configured to automatically send a request for assistance, or an alert message (e.g., to a family member, care provider, doctor, nurse, etc.) in response to receiving an alert from the temperature sensor 320, acceleration sensor 325, or location determination system 330, indicating a potential danger to a user of the personal alert device 165.

The input/output 310 allows for interaction between the user and the personal alert device 165. In some embodiments, the input/output 310 may include a display, touchscreen display, a button, a microphone, a speaker, a keyboard, a communication interface (e.g., USB, DisplayPort, HDMI, etc.) to which an additional device or system may be connected to allow for interaction with the user, and the like. For example, the input/output 310 may include a speaker to indicate to the user that an alert has been triggered (e.g., by the acceleration sensor 325 in response to a potential fall) and instruct the user to press a button to prevent an alert message being transmitted (e.g., by the communication system 305) to a caregiver, health provider, or another computing system (e.g., the monitoring and interaction control system 130) for further analysis. The user may then press a button of the input/output 310 to indicate they are safe, and transmission of the alert message is not needed.

The temperature sensor 320 may measure an ambient temperature (e.g., a temperature of the air surrounding the personal alert device 165), a specific temperature (e.g., of a user of the personal alert device 165, of an object such as a food or fluid near the user, etc.), and generate temperature information for use by the personal alert device 165 or transmission via the communication system 305 to an caregiver or computing system (e.g., the monitoring and interaction control system 130). Temperature information generated by the temperature sensor 320 may be used by the personal alert device 165 to generate an alert. For example, the temperature sensor 320 may generate temperature information indicating an ambient temperature of 32 degrees Fahrenheit (0 degrees Celsius). In response to the generated temperature information, the personal alert device 165 may generate and transmit an alert message to a caregiver indicating the personal alert device 165 is in a location with a dangerous temperature. In some embodiments, the personal alert device 165 may include a delay before sending the alert message, for example in case the user has gone outside temporarily (e.g., to receive a delivery). In such embodiments, the delay in transmitting the alert message may assist in reducing a number of unnecessary alert messages transmitted to a caregiver or the monitoring and interaction control system 130.

The acceleration sensor 325 is a sensor configured to measure acceleration of the personal alert device 165. For example, the acceleration sensor 325 may be a single-axis accelerometer, a two-axis accelerometer, three-axis accelerometer, piezo-electric accelerometer, capacitive accelerometer, or any other sensor type capable of generating acceleration information for use in determining a current acceleration or change in acceleration of the personal alert device 165. Acceleration information generated by the acceleration sensor 325 may be transmitted (e.g., via the communication system 305) to another computing system (e.g., the monitoring and interaction control system 130) for further analysis or processing. For example, the personal alert device 165 may transmit acceleration information generated by the acceleration sensor 325 to the monitoring and interaction control system 130 so that the monitoring and interaction control system 130 can determine whether the acceleration information indicates a potential danger (e.g., a fall, an impact, etc.) to a user of the personal alert device 165. The monitoring and interaction control system 130 may then generate a response action (e.g., an alert message, a diagnosis, a treatment recommendation, providing a treatment, providing assistance, etc.) to be transmitted to a provider, caregiver, or another system if it is determined that the acceleration information indicates a potential danger to the user. In some embodiments, the personal alert device 165 may determine, based on the acceleration information, that a potential danger to the user has occurred. The personal alert device 165 may then transmit an alert (e.g., via the communication system 305) indicating the potential danger.

The location determination system 330 is configured to generate location information for the personal alert device 165. The location determination system 330 may be, for example, a Global Positioning System receiver, a cellular location positioning system, a beacon-based (e.g., wireless router, Bluetooth, radio frequency, infrared, etc.) location determination system, or other system by which the location determination system 330 may determine an absolute or relative position of the personal alert device 165. In some embodiments, the location information generated by the location determination system 330 may be used to provide real-time, periodic, or event-based location information to another system (e.g., the monitoring and interaction control system 130). For example, event-based location information may be generated by the location determination system 330 in response to an alert generated by the personal alert device 165. The event-based location information may indicate the location of the personal alert device 165 at the time the alert was generated, or at a time of transmission of an alert message. The location information may be included in an alert message based on the alert, as metadata for the alert message, as metadata for information associated with the alert, and the like. In some embodiments the personal alert device 165 may generate an alert message based on the location determination system 330.

For example, historical information associated with a user may indicate the user is likely to be within a geographic area within a time window (e.g., 5:00 PM to 7:00 AM, standard working hours, a time associated with a regular medical visit, etc.). The personal alert device 165 may generate an alert based on location information for the user indicating the user is not in the geographic area during the time window. The personal alert device 165 may then transmit an alert message (e.g., via the communication system 305) to a healthcare provider, caretaker, relative, the monitoring and interaction control system 130, or another person or computing system that may process or respond to the alert message, indicating the user associated with the personal alert device 165 is outside of the expected geographic location.

In another example, activity information for the user may indicate the user has an appointment, and the appointment is associated with a geographic location. The personal alert device 165 may then generate an alert. In response to the alert, the personal alert device 165 may play a message by a speaker of the input/output 310 indicating to the user that they are late for the appointment. The message may include additional information, such as the location of the appointment, start time of the appointment, purpose of the appointment, and the like.

In some embodiments, such as where the personal alert device 165 transmits location information in real time, or periodically, the location determination system 330 may determine location information indicates an alert or alert message is to be generated.

Execution Environment

Figure 4:
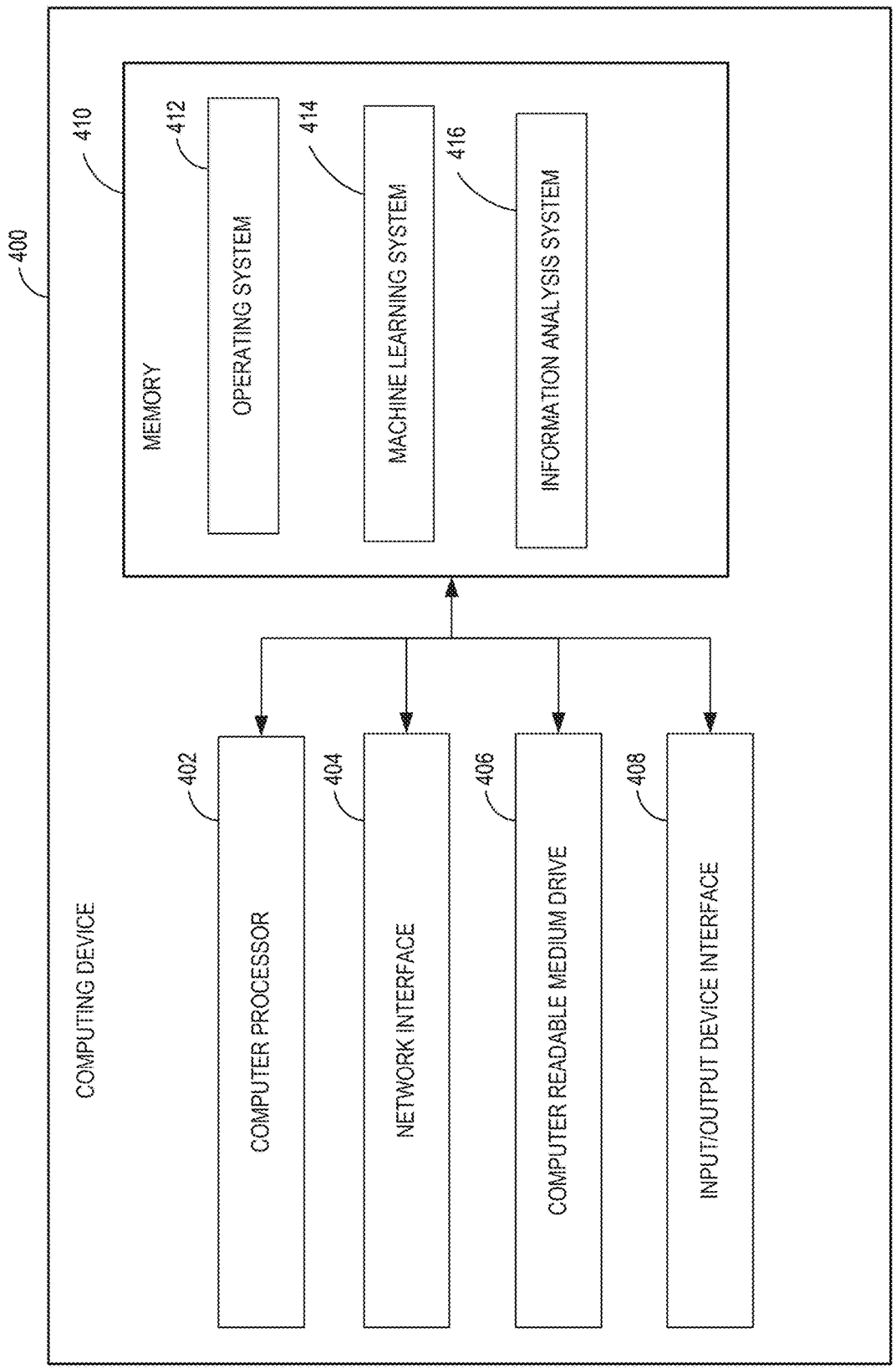
FIG. 4 is a block diagram of an illustrative computing system configured to provide interactive vitality monitoring and analysis according to some embodiments.

FIG. 4 illustrates various components of an example computing device 400 configured to implement various functionality described herein.

In some embodiments, the computing device 400 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the computing device 400 may be implemented as web services consumable via one or more communication networks. In further embodiments, the computing device 400 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment In some embodiments, as shown, computing device 400 may include: one or more computer processors 402, such as physical central processing units ("CPUs"); one or more network interfaces 404, such as a network interface cards ("NICs"); one or more computer readable medium drives 406, such as a high density disk ("HDDs"), solid state drives ("SSDs"), flash drives, and/or other persistent non-transitory computer readable media; one or more input/output device interfaces 408; and one or more computer-readable memories 410, such as random access memory ("RAM") and/or other volatile non-transitory computer readable media.

The computer-readable memory 410 may include computer program instructions that one or more computer processors 402 execute and/or data that the one or more computer processors 402 use in order to implement one or more embodiments. For example, the computer-readable memory 410 can store an operating system 412 to provide general administration of computing device 400. As another example, the computer readable memory 410 can store machine learning system 414 for training or executing a machine learning model. As another example, the computer-readable memory 410 can store an information analysis system 416 configured to analyze information received by the computing device 400 to generate an output.

User Analysis and Personalization Routines

When a routine described herein (e.g., routine 500, 600, 700, 800, or 900) is initiated, a set of executable program instructions stored on one or more non-transitory computer-readable media (e.g., hard drive, flash memory, removable media, etc.) may be loaded into memory (e.g., random access memory or RAM) of a computing device, such as the computing device 400 shown in FIG. 4, and executed by one or more processors. In some embodiments, the routine 500, 600, 700, 800, or 900, or portions thereof may be implemented on multiple processors, serially or in parallel. Additionally, the routine 500, 600, 700, 800, and 900, while described herein as having an end, may run continuously, and may return to earlier portions of a described routine instead of proceeding to an end shown in the figure.

Figure 5:
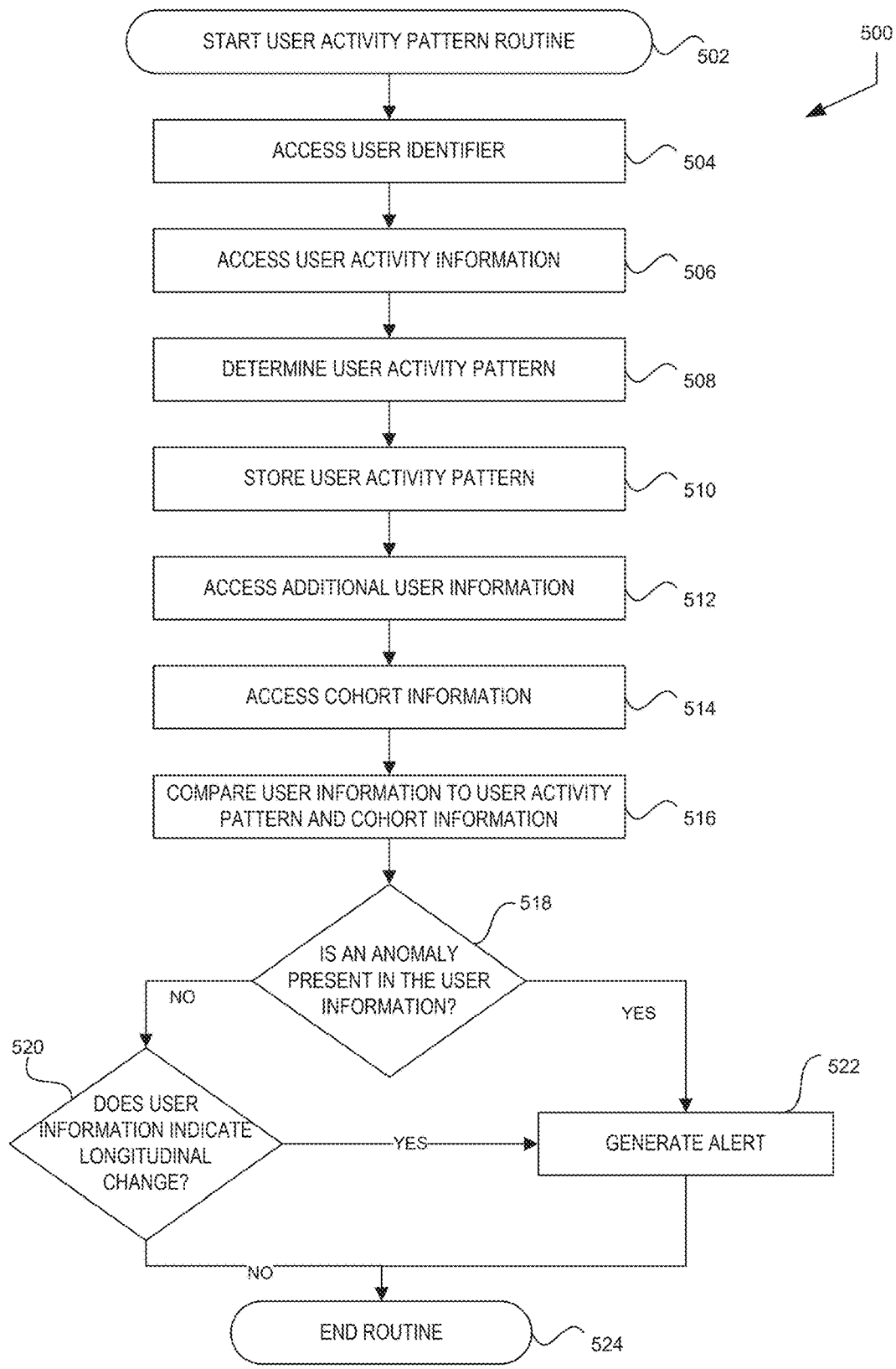
FIG. 5 is a flow diagram of an illustrative routine for determining and processing a user activity pattern according to some embodiments.

FIG. 5 illustrates example routine 500 for generating and analyzing user activity pattern information to identify an anomaly or change. The routine 500 begins at block 502, for example in response to a new user being registered with the monitoring and interaction control system 130 as a user to be monitored. In some embodiments, the routine 500 may run, in whole or in part, continuously, for example during routine user monitoring by the monitoring and interaction control system 130 of a previously registered user.

At block 504, the monitoring and interaction control system 130 accesses a user identifier. The user identifier may be used to uniquely identify a user associated with the monitoring and interaction control system 130. The user identifier may allow the monitoring and interaction control system 130 to determine information to access from the historical data system 180, activity information collection system 170, or machine learning model provider system 195. Additionally, the user identifier may allow the monitoring and interaction control system 130 to identify a personal alert device 165, power sensing device 190, user device 110, or other sensing device 140 associated with the user. Further, the user identifier may be associated with credentials to allow the monitoring and interaction control system 130 to access information associated with the user from other systems or devices.

At block 506, the monitoring and interaction control system 130 accesses user information associated with the user. The monitoring and interaction control system 130 may access activity information associated with the user from the activity information collection system 170. The monitoring and interaction control system 130 may access user historical information from the historical data system 180. In some embodiments, the monitoring and interaction control system 130 may interact with a user to obtain additional user information. For example, the user interface subsystem 205 of the monitoring and interaction control system 130 may generate user interface information to cause display of an interactive graphical user interface (e.g., via the user device 110). The monitoring and interaction control system 130 may then present questions via the graphical user interface to the user that cause the user to provide additional user information in response. In some embodiments, the monitoring and interaction control system 130 may provide a machine learning model (e.g., the personalized assistant, virtual guide, or other machine learning model as described below in relation to FIGS. 6-8, and 10-15) to interact with the user. The machine learning model may then generate questions based on the accessible user information to obtain additional user information. For example by determining that user information may indicate a potential health problem and then generating questions to assess the user's likelihood of having the potential health problem. In another example, the monitoring and interaction control system 130 may generate questions to obtain user calendar information, such as upcoming appointments.

At block 508, the monitoring and interaction control system 130 determines a user activity pattern for the user. In some embodiments, a machine learning model (e.g., stored in the machine learning data store 235, or provided by the machine learning model provider system 195) may generate the user activity pattern based on the user information. The user activity pattern indicates a set of expected activities, interactions, or a level of functioning (e.g., a gait, use of a mobility assistance device, etc.) associated with the user. For example, the user activity pattern may include medication information for the user indicating a time or type of medication to be dispensed by a user assistance device 160. In another example, the user activity pattern may indicate a frequency or time associated with urination, defecation, eating, drinking, sleep, a mood, and the like. In further examples, the user activity pattern may indicate an expected location for the user at specific times or within time windows. The user activity pattern may include any additional information indicating a user's expected location, expected activity associated with a time or location, or level of function.

Various techniques may be used to generate the user activity pattern for this user. In some embodiments, a generation phase may occur where information received by the monitoring and interaction control system 130 from various sensing devices 140, user assistance device 160, and other information sources are used to identify statistical norms for the user's activity. A statistical norm may include an average time of day the user is in a location (e.g., a restroom, kitchen, doctor's office, car, etc.) and may include a deviation parameter to account for variation in this average time (e.g., a user may use a bathroom at about 8:30 AM when they wake up, and the deviation parameter may provide a range around this time to account for normal variance in the user's sleeping pattern or bathroom use pattern). A statistical norm may include a frequency with which an activity is conducted within a particular timeframe. For example, a user may open the fridge to get food 3-5 times a day, and the user activity pattern may include this range of frequencies with which the user performs the activity of opening the fridge. Such norms or deviations may be combined to generate the user activity pattern. Further, the user activity pattern may be updated in an ongoing manner (e.g., constantly as new information is received, at a fixed interval, etc.) to more accurately reflect the user's activity based on additional information.

At block 510, the monitoring and interaction control system 130 stores the user activity pattern. The user activity pattern may be stored locally by the monitoring and interaction control system 130, or on another system such as the activity information collection system 170 or historical data system 180. The user activity pattern may be obfuscated (e.g., by encryption) such that access to the user activity is restricted. For example, user credential information associated with the user identifier may be used to access the user activity pattern.

At block 512, the monitoring and interaction control system 130 accesses additional user information associated with the user. The additional user information may be received from the user assistance device 160, sensing device 140, user device 110, robotic device 120, activity information collection system 170, personal alert device 165, power sensing device 190, machine learning model provider system 195, or any other system or device generating information associated with the user. The additional user information may be received in real time, periodically, in response to an event, or in response to the user providing the information to the monitoring and interaction control system 130 or other device. The additional user information may be part of an alert received by the monitoring and interaction control system 130, or alert message generated by the monitoring and interaction control system 130.

At block 514, the monitoring and interaction control system 130 accesses cohort information from the historical data system 180. The cohort information may include anonymized health information for people with a similar set of attributes to the user. An attribute may include a pattern of activity (e.g., sleep schedules, eating schedules, etc.), a health condition (e.g., an illness, disease, injury, disorder, etc.), age, location, socioeconomic status, current location, location of a residence, location of birth, sex, and the like. The anonymized health information may include, for example, a frequency of a health condition, a likelihood of a health condition, a mortality risk, a cancer risk, a risk value associated with another health condition, a probability of a risk of hospitalization, and the like. The cohort information may include information that links one or more attributes to a health condition or risk of a health condition or other information in the anonymized health information. For example, the cohort information may indicate a percentage of individuals in the cohort that have been diagnosed with a health condition when they have a symptom (e.g., back pain, change in gait, change in mobility, vomiting, etc.). In some embodiments, selection of health information to include in the cohort health information may be based in part on identifying individuals with a similar activity pattern to the user.

At block 516, the monitoring and interaction control system 130 compares the additional user information to the user activity pattern and the cohort information. To compare additional user information to the user activity pattern, the monitoring and interaction control system 130 may use various statistical techniques to identify statistically significant deviations from a norm indicated in the user activity pattern. For example, the monitoring and interaction control system 130 may use a cluster analysis to group information associated with similar behaviors in the user activity pattern. Additionally, in this example, the cohort information may be similarly clustered to determine normal activity ranges for the cohort. Then, using cluster analysis, the monitoring and interaction control system 130 may determine when the additional information associated with the user would fall outside of the cluster of similar behaviors within the user activity pattern or the cohort information. Comparing the additional user information to the user activity pattern may indicate an anomaly in the additional user information. Such an anomaly may indicate a change in the user's health. The change in the user's health may indicate the user has developed, or may have developed, a health condition. In some cases, the health condition which the user has, or may, develop may suggest the user should seek medical attention. Alternatively, the health condition the user has, or may, develop may be determined by the monitoring and interaction control system 130 to be part of an expected or likely change in the user's health (e.g., a progression of a mobility issue, change in health condition due to age, etc.). Additionally, an anomaly may not be related to a health condition. For example, if a user is expected, based on the user's activity pattern, to be at an appointment, an anomaly may represent the user not being in a location associated with the appointment at the time of the appointment. In some cases, an anomaly may not be directly related to the user's location or health. For example, a sensing device 140 may be a temperature sensor configured to generate temperature information for at least a portion of the user's residence. The temperature sensor may indicate a low temperature in the user's residence that is outside of the expected temperature of the user's residence. Comparing the temperature information to an expected temperature may then indicate the temperature is outside of an expected range, indicating an anomaly that the monitoring and interaction control system 130 can further analyze (e.g., to generate an alert as described in relation to block 522 below herein).

At decision block 518, the monitoring and interaction control system 130 determines whether there is an anomaly present in the additional user information. An anomaly, as used herein, is associated with user information indicating that assistance should be provided to the user. Whether an anomaly is present in the additional user information may be determined, for example, based on the comparison of the additional user information to the user activity pattern or cohort information as described in relation to block 516 above herein. Examples of anomalies in the additional user information may include determining a user is not in an expected location within an expected time period as indicated by the user activity patter, a user missing a medication does (e.g., determined based on information from a medication dispensing user assistance device 160), a user's physiological measurements (e.g., blood pressure, heart rate, blood glucose, SpO2, etc.) being outside of an expected range, and the like. If there is an anomaly present in the additional user information, the routine 500 moves to block 522 to generate an alert. Otherwise, the routine 500 moves to decision block 520.

At block 522, the monitoring and interaction control system 130 generates an alert in response to the anomaly. Some alerts generated by the monitoring and interaction control system 130 may include an alert message requesting assistance for the user, or causing assistance to be provided to the user automatically. For example, the additional user information may indicate the user is likely to have fallen. The monitoring and interaction control system 130 may then generate an alert message and transmit the alert message to a healthcare provider, caretaker, or the like to request assistance for the user.

Some alerts generated by the monitoring and interaction control system 130 may cause an update to user information (e.g., user information stored by the robotic device 120 or historical data system 180), with or without causing an alert message to be transmitted. For example, an alert updating the user information may be generated where an anomaly is determined to be part of a normal, or expected, change in a user's status over time (e.g., a longitudinal change). For example, a user using a bathroom at an unexpected time during the night may not cause the monitoring and interaction control system 130 to generate an alert requesting assistance for the user where the increased frequency of urination aligns with an expected or acceptable change based on the user's age (e.g., determined based on the cohort information). Instead, the alert generated by the monitoring and interaction control system 130 may be transmitted to the activity information collection system 170 or historical data system 180 to update the user's activity pattern. However, the change to the user's activity pattern may indicate that an alert is to be sent to a medical provider or caretaker. Following the previous example, the user's change in urination frequency may indicate a potential prostate or bladder problem, and the monitoring and interaction control system 130 may contact a medical provider or caretaker to suggest, or automatically schedule, an appointment for additional diagnosis or care (e.g., from the medical provider) for the user.

In some embodiments, the monitoring and interaction control system 130 may delay generating an alert, or not generate an alert. For example, a sensing device 140 may be a microphone in the user's residence used to identify anomalous sounds. Information received from the microphone may indicate a fire alarm in the residence has been activated, however in some cases the activation of a fire alarm may be temporary (e.g., the user has burned food during cooking). Additionally, generating an alert for every fire alarm activation may cause an overuse of emergency services, leading to inefficient provisioning of emergency assistance to others. Therefore, advantageously, the monitoring and interaction control system 130 may wait for a set period of time (e.g., a static threshold, or a dynamic threshold), or until a second sensing device 140 (e.g., a temperature sensor) provides additional information, that would indicate the fire alarm is likely not a false alarm. The monitoring and interaction control system 130 may then generate the alert in response to the set period of time having passed, or the additional information from the second sensing device 140 being received. Alternatively, where the microphone indicates the fire alarm has stopped within the set period of time, or where no additional information indicating a fire is received during the set period of time from the second sensing device 140, the monitoring and interaction control system 130 may not generate an alert.

Generating the alert may cause the monitoring and interaction control system 130 to generate or transmit an alert message as described previously. When the alert has been generated, and where an alert message is generated the alert message has been transmitted, the routine 500 moves to block 524 and ends.

At decision block 520, The monitoring and interaction control system 130 determines whether the additional user information indicates a longitudinal change in the user's health. Where the additional user information indicates a longitudinal change in the user's health, the routine 500 may proceed to block 522 and the monitoring and interaction control system 130 may generate an alert to update the user's activity pattern or other health information, as described previously with respect to block 522. Alternatively, where the user information does not indicate a longitudinal change, the routine 500 moves to block 524 and ends.

Figure 6:
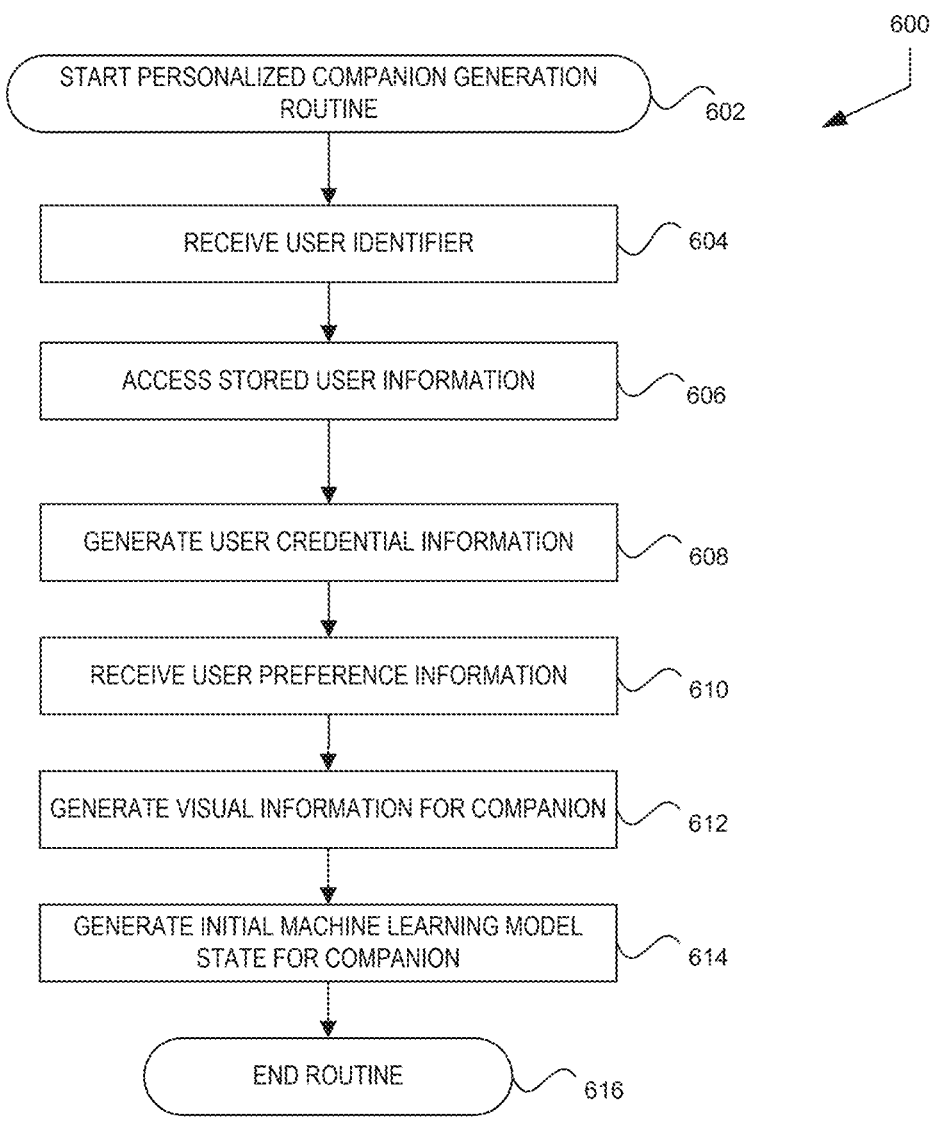
FIG. 6 is a flow diagram of an illustrative routine for generating a personalized companion according to some embodiments.

FIG. 6 illustrates example routine 600 for generating a personalized companion for a user. The routine 600 begins at block 602, for example in response to for example in response to a new user being registered with the monitoring and interaction control system 130 as a user to be monitored. In some embodiments, the routine 600 may begin in response to a user requesting a new personalized companion from the monitoring and interaction control system 130.

At block 604, the monitoring and interaction control system 130 receives a user identifier. The user identifier may be the user identifier generated as part of registering a new user according to routine 500 described with respect to FIG. 5 herein. Alternatively, the user identifier may be a new user identifier provided by the user via an interactive graphical user interface and associated with the use of the personalized companion.

At block 606, the virtual avatar interaction system 215 accesses stored user information. In some embodiments the virtual avatar interaction system 215 may access stored user information based on the user identifier received at block 604. In some embodiments, where a user identifier is used by a user to access the personalized companion that is different than the user identifier associated with the user by the monitoring and interaction control system 130 for user monitoring and analysis, the monitoring and interaction control system 130 may associate the two user identifiers so that user information provided by the user to the personalized assistant may be accessed by the monitoring and interaction control system 130. The user identifier may be used to uniquely identify a user associated with the monitoring and interaction control system 130. The user identifier may allow the monitoring and interaction control system 130 to determine information to access from the historical data system 180, activity information collection system 170, or machine learning model provider system 195. Additionally, the user identifier may allow the monitoring and interaction control system 130 to identify a personal alert device 165, power sensing device 190, user device 110, or other sensing device 140 associated with the user. Further, the user identifier may be associated with credentials to allow the monitoring and interaction control system 130 (e.g., the virtual avatar interaction system 215) to access information associated with the user from other systems or devices. For example, the virtual avatar interaction system 215 may attempt to access historical user information from the historical data system 180 (e.g., education information, family information, etc.) to allow the personalized companion to generate messages for the user that are more likely to align with a user's preference without requiring the user to enter already-accessible information (e.g., level of education to determine a reading level to which messages should be generated, family member names, etc.).

At block 608, the virtual avatar interaction system 215 generates user credential information for the user. The user credential information may be associated with the personalized companion generated as part of the routine 600 in order to ensure that access to the personalized assistant, and the information associated with the personalized assistant, is restricted to the user or another individual or entity authorized by the user. In some embodiments, user credential information may be generated based on a username or password entered by the user. The username or password may be entered in an interactive graphical user interface provided to the user by the virtual avatar interaction system 215, or based on information provided by the virtual avatar interaction system 215 to a computing system (e.g., the user device 110). In some embodiments, the user credential information may include biometric information. For example, the user credential information may include facial recognition information, fingerprint information, or other information derived from a biometric sensor or camera. The user credential information may be a hashed, encrypted, or otherwise obfuscated by the monitoring and interaction control system 130 to restrict unauthorized access to the user credential information. In some embodiments, the user credentials may be associated with a device (e.g., the personal alert device 165) associated with the user.

At block 610, the virtual avatar interaction system 215 receives user preference information from the user. In some embodiments, the user preference information may be received via an interactive graphical user interface. The interactive graphical user interface may be provided by the virtual avatar interaction system 215. In some embodiments, the virtual avatar interaction system 215 may generate a prompt to be provided to the user to request user preference information. A prompt may be pre-generated (e.g., one of a set of standard questions), may be generated according to a set of rules based on other user preference information accessible to the virtual avatar interaction system 215 (e.g., previously-provided preference information), or may be generated by a machine learning model. In some embodiments, the virtual avatar interaction system 215 may access stored information (e.g., information in the activity information collection system 170 or the historical data system 180) to determine at least a portion of the user preference information. In some embodiments, the virtual avatar interaction system 215 may use a machine learning model to derive user preference information from the stored user information. Examples of user preference information include a favorite sport, favorite color, daily routine, preferred sleeping hours, preferred meal time, an interest (e.g., reading, photography, hiking, etc.), an area of disinterest (e.g., an activity or topic which the user is not interested in discussing), and the like. In some embodiments, user preference information may include a preference for the personalized assistant. A preference for the personalized assistant may include, for example, an age, a gender, a style of speech (e.g., casual, formal, a dialect associated with a geographic area, an accent, a direct speech style, a level of friendliness, etc.), a level of previous familiarity (e.g., restricting the amount of user information available to the personalized companion initially to replicate the experience of getting to know a person), a nickname for the user, a name for the personalized companion, and the like. User preferences affecting the style or manner of response of the machine learning model may cause the machine learning model to generate responses in line with a personality (e.g., kind childhood friend, loving parent, etc.).

At block 612, the virtual avatar interaction system 215 generates visual information for the personalized companion. The virtual avatar interaction system 215 may use a machine learning model to generate the visual information for the personalized companion. For example, the virtual avatar interaction system 215 may apply at least a portion of the user preference information as input to a machine learning model to cause the machine learning model to generate the visual information for the personalized companion. In some embodiments, an image of the personalized companion, based on the visual information, may be presented to the user. The user may then confirm acceptance of the appearance of the personalized companion, request a modification to the appearance of the personalized companion, or request a new appearance for the personalized companion. In some embodiments, the virtual avatar interaction system 215 may provide a suggestion to the user for the appearance of the personalized companion, for example based on user information associated with the user (e.g., the user's age, location of residence, etc.). In some embodiments, the user may provide an image to the virtual avatar interaction system 215. The virtual avatar interaction system 215 may generate the appearance of the personalized assistant based on the provided image.

At block 614, the virtual avatar interaction system 215 generates an initial machine learning model state for the personalized companion. In some embodiments, the virtual avatar interaction system 215 may generate the initial state for the machine learning model state by applying user information, user preference information, or user credential information as input to the machine learning model as part of a prompt to the machine learning model. Providing such information as a prompt to the machine learning model may cause the machine learning model to generate a prompt that causes a machine learning model (e.g., the same machine learning model or a different machine learning model) to respond as the personalized companion based on the user information or user preference information. In some embodiments, at least a portion of the user information, user preference information, or a response generated by a machine learning model during generation of the initial machine learning model state may be vectorized and stored as a vector to enable more efficient search or access to the vectorized information. In some embodiments, the initial state of the personalized companion may be stored as a prompt to be provided to a machine learning model when initiating a conversation session between the personalized companion and the user that causes the machine learning model to response as the personalized companion (e.g., based on the user preference information or user information). When the initial machine learning model state for the companion has been stored, the routine 600 moves to block 616 and ends.

Figure 7:
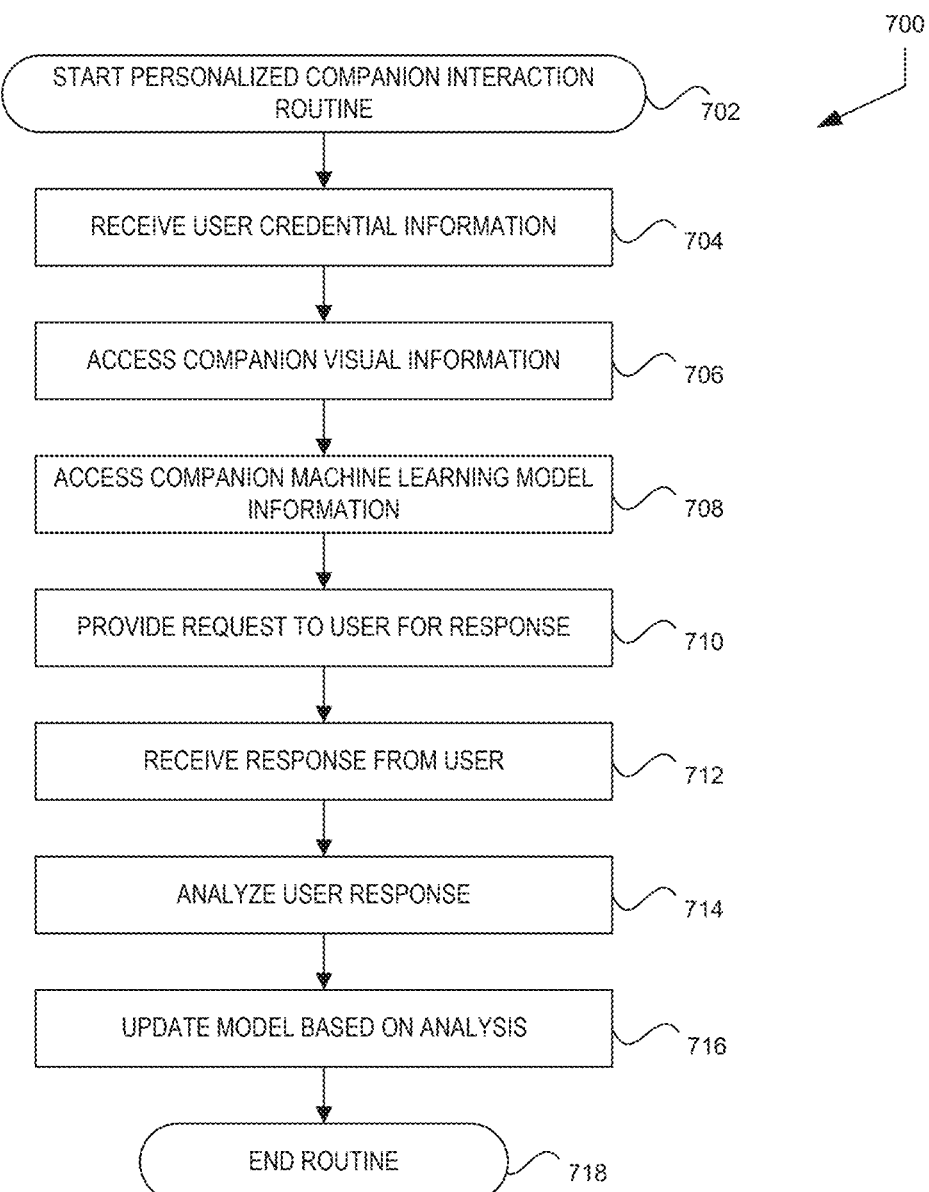
FIG. 7 is a flow diagram of an illustrative routine for providing interaction with a personalized companion according to some embodiments.

FIG. 7 illustrates example routine 700 for providing and interaction between a user and a personalized companion. The routine 700 begins at block 702, for example in response to a user initiating an interaction session with the personalized companion (e.g., by sending a chat message or request to the monitoring and interaction control system 130).

At block 704, the virtual avatar interaction system 215 receives user credential information. In some embodiments, the user credential information may be received via an interactive graphical user interface provided by the virtual avatar interaction system 215. The interactive graphical user interface may be presented to the user, for example, by the user device 110 or the robotic device 120. In some embodiments, the user credential information may be biometric, vocal, or other information that can be used to identify the user. In such embodiments, there may not be an interactive graphical user interface provided for the user. The user credential may be received based on information received from a microphone, camera, or biometric sensor of the user device 110 or robotic device 120.

At block 706, the virtual avatar interaction system 215 accesses visual information for the personalized companion. The virtual avatar interaction system 215 may generate an image, video, or other display information for the personalized companion based on the visual information for the personalized companion. The visual information may be the visual information generated in routine 600 described previously herein.

At block 708, the virtual avatar interaction system 215 accesses a companion machine learning model configured to provide personalized companion interactions with a user. In some embodiments, accessing the companion machine learning model by the virtual avatar interaction system 215 may include accessing a plurality of machine learning models to provide the personalized companion. For example, the virtual avatar interaction system 215 may access an image or video model to generate visual information for the personalized companion, a text generation model (e.g., an LLM) to generate text or speech information for the personalized companion, or a voice model to generate or receive audio information for the personalized companion. Accessing multiple machine learning models may allow the virtual avatar interaction system 215 to provide a more complete personalized companion that includes visual, audio, and text components. The machine learning model used by the virtual avatar interaction system 215 may enable the personalized companion to converse with the user in natural language by generating and responding to natural language information in text or audio form. Further, the virtual avatar interaction system 215 may initialize a machine learning model using an initial machine learning model state. The initial machine learning model state may be the information described above herein with respect to routine 600. The initial machine learning model state may further include, for example, a preferred writing style (e.g., simple, direct, long-winded, college level, high school level, etc.), a preferred voice style, an image generated for or provided by the user for use in generating further image or video information, and the like. Further, the machine learning model may be provided companion history information. Companion history information may be based on information associated with a real person, for example a birthdate, educational history, writing sample, voice sample, or other information associated with the real person. The companion history information may allow the machine learning model enabling conversation between the user and the virtual avatar interaction system 215 to simulate, at least in part, the real person with whom the companion history information is associated. In some embodiments, the companion history information may be for a fictional person and some or all of the companion history information may be fictional. Additionally, the initial machine learning model state may be an updated initial machine learning model that has been updated based on interactions between the user and the personalized companion.

At block 710, the personalized companion of the virtual avatar interaction system 215 provides a request, or prompt, to the user to cause the user to provide a response. For example, the request may be a question generated by the companion machine learning model, or a sentence in a conversation generated by the machine learning model that the user may respond to.

At block 714, the virtual avatar interaction system 215 analyzes the user response. Analysis of the user response is described in further detail below herein with respect to FIG. 8.

At block 716, the virtual avatar interaction system 215 updates the machine learning model based on the result of analyzing the user response. Updating the machine learning model may include, for example, updating a prompt provided to the machine learning model when the personalized companion is initialized for interaction (e.g., the initial machine learning model companion state), or updating information accessed by the machine learning model to include information based on the result of analyzing the user's response. When the machine learning model has been updated based on the result of analyzing the user response, the routine 700 moves to block 718 and ends.

Figure 8:
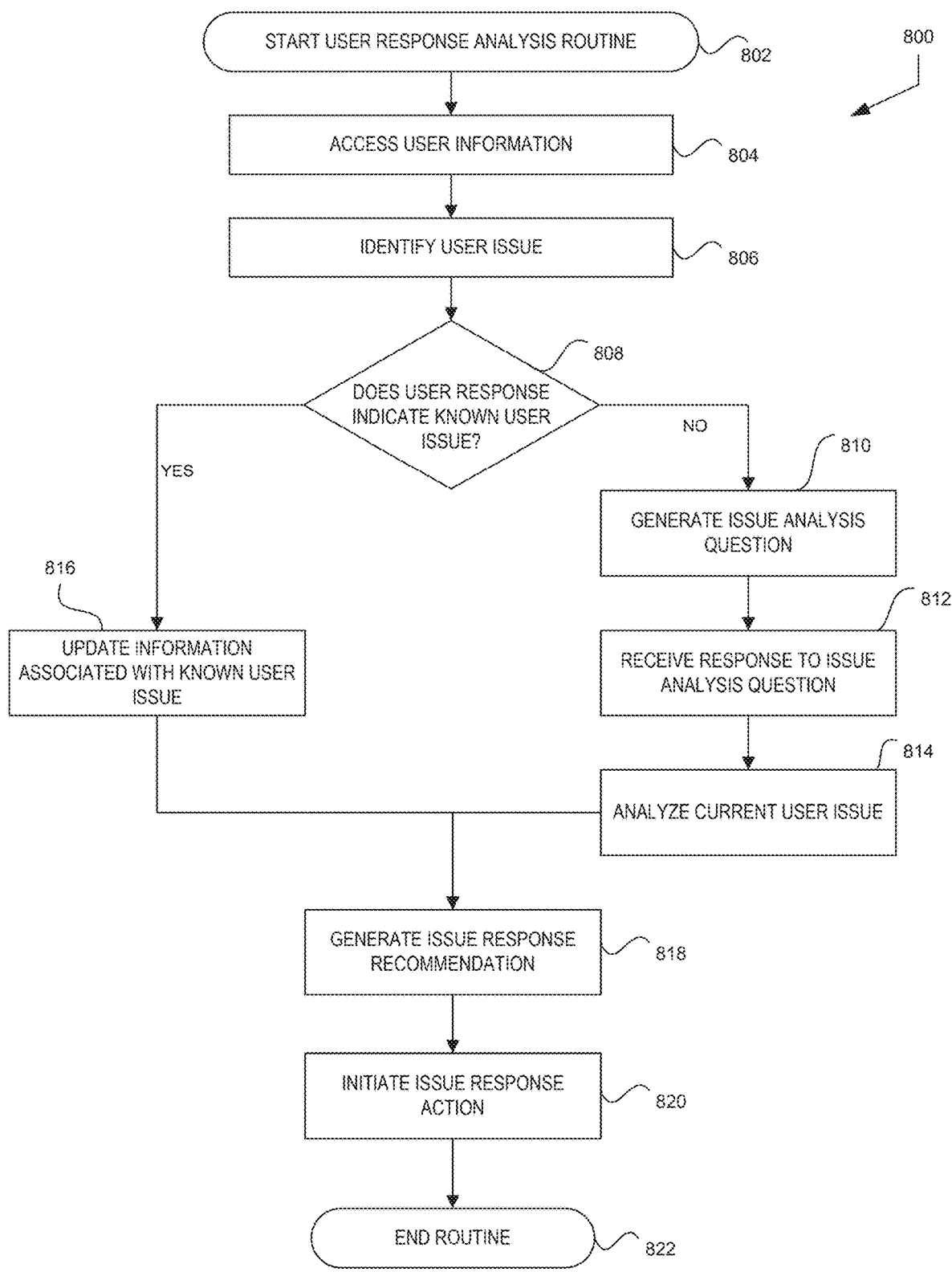
FIG. 8 is a flow diagram of an illustrative routine for analyzing a user response according to some embodiments.

FIG. 8 illustrates example routine 800 for analyzing a user's response during an interaction between the user and a personalized companion provided by the monitoring and interaction control system 130. The routine 800 begins at block 802, for example in response to a user response being received by the monitoring and interaction control system 130 (e.g., at block 712 of routine 700 above herein).

At block 804, the virtual avatar interaction system 215 accesses user information associated with the user from which the response was received. The user information may include the user activity pattern stored by the activity information collection system 170. The user information may include user historical information stored by the historical data system 180. In some embodiments, the virtual avatar interaction system 215 may request updated information from another system or device (e.g., the robotic device 120, the personal alert device 165, the power sensing device 190, etc.). For example, the virtual avatar interaction system 215 may determine the user response includes a reference to the user cooking. The virtual avatar interaction system 215 may then request information from the power sensing device 190 and a temperature sensing device 140 associated with the user's stove, based on determining such information is relevant to the user's reference to cooking.

At block 806, the virtual avatar interaction system 215 identifies a user issue based at least in part on the accessed information. In some embodiments, a known user issue may be stored by the monitoring and interaction control system 130 as part of a data object used to represent a plurality of known issues. The virtual avatar interaction system 215 may then parse the data object to identify one or more known user issues. For example, the data object may include an indication of the types of known user issues (e.g., as key values in a key-value pair) and may also store information associated with the known issue (e.g., as an associated value in a key-value pair). Additionally, the data object may include further information, or metadata, indicating a location with a data store where additional information associated with the issue can be accessed. In some embodiments, a single user issue may be represented by a data object. For example, a user may be known to have a food allergy to peanuts and soy. The monitoring and interaction control system 130 may store information related to the food allergy in a data object indicating the type of user issue is a food allergy. The data object of this example may further store that the food allergy relates to peanuts and soy, such that the virtual avatar interaction system 215 can parse the data object to efficiently determine the type and cause of the user issue.

In some embodiments, a user issue data object may store information related to a last time the issue arose (e.g., for a food allergy the most recent date of an allergic reaction), previous treatment information, current treatment information (e.g., medication taken to manage the user issue), or an issue severity rating (e.g., potentially fatal, likely fatal, potential hospitalization required, a value in a numbered scale indicating a relative severity, etc.). In some embodiments, the user issue may not be stored in a data object, or not yet stored in a data object, and the virtual avatar interaction system 215 may identify the user issue directly from the accessed user information. The virtual avatar interaction system 215 may use a rules-based approach to identify user issues from user information. For example, the virtual avatar interaction system 215 may use keyword analysis to identify keywords in the user information that indicate a user issue. In another example, the virtual avatar interaction system 215 may apply the user information as input to a machine learning model to cause the machine learning model to output an indication of the user issue.

In some embodiments, the virtual avatar interaction system 215 may identify a user issue from the user response. For example, a portion of a user response may state "I have always felt sick after eating cheese," and the virtual avatar interaction system 215 may determine, based on the response, that the user has an existing lactose intolerance. The portion of the user response indicating an existing user issue may not be associated with a portion of the user response that indicates the user is experiencing a current user issue. Following the previous example, a larger portion of the user response may state "I have always felt sick after eating cheese. I haven't eaten any cheese today but my stomach is upset." In this example, the first sentence indicates the existing user issue, and the second sentence relates to the user experiencing a current issue, which will be analyzed further in the routine 800.

At decision block 808, the virtual avatar interaction system 215 determines whether the user response indicates a known user issue. In some embodiments, the virtual avatar interaction system 215 may provide the user response as input to a machine learning model to cause the machine learning model to generate an output indicating a classification or type of user issue present in the user response, or indicating that no user issue is present in the user response. In some embodiments, the virtual avatar interaction system 215 may use a keyword-based approach to identify a user issue in the user response. As used herein, a "keyword" may be a single word or a phrase. Additionally, a keyword may be stored or applied such that similar words are associated with the keyword (e.g., a keyword "cut" may be associated with "wound," and "knife injury" such that any of "cut," "wound," or "knife injury," indicate a same type of user issue).

For example, the virtual avatar interaction system 215 may access or store a set of keywords that are associated with a user issue, and may compare the words or phrases in the user response to the keyword to identify a match. The identified match may then indicate the type of the user issue, or be used to identify information associated with the user issue. For example, a user response may state "I fell earlier today and my leg hurts." The virtual avatar interaction system 215 may then access the set of key words used to identify or classify user issues, and match the word "fell" in the user response with the set of keywords. The keyword "fell" may then be associated with a general class of user issues relating to fall injuries. In this example, the virtual avatar interaction system 215 may then determine whether the fall being referred to relates to a previously-known fall (e.g., the user fell in the previous month and is commenting on their recovery from the fall), or whether the fall being referred to in the user response may be related to a new fall. Where the virtual avatar interaction system 215 is unable to determine whether the fall indicated in the user response refers to a previous or new fall event, the virtual avatar interaction system 215 may assume the fall refers to a new fall event for the safety of the user.

In an additional example, the virtual avatar interaction system 215 may apply the user response as input to a machine learning model configured to generate an output indicating a user mood, or other mental health indicator. The virtual avatar interaction system 215 may then determine whether an output of the machine learning model indicates the user is affected by a previously-identified mood or mental health disorder, or whether the user response indicates a new mood or mental health disorder. Further, the output of the machine learning model may be used to determine whether the user response indicates a change in the severity of an existing mood or mental health disorder. In some embodiments, a change in the severity of an existing mood or mental health disorder may be processed similarly to a new mood or mental health disorder, so that the virtual avatar interaction system 215 may further analyze the extent of the change or the impact of the change on the user.

If the virtual avatar interaction system 215 determines that the user response indicates a known (e.g., previously-identified) user issue, the routine 800 moves to block 816. If the virtual avatar interaction system 215 determines that the user response indicates a new (e.g., not previously-identified, or not stored in the accessed user information) user issue, the routine 800 moves to block 810. Where the virtual avatar interaction system 215 determines that the user response may indicate a user issue, but is unable to determine whether the user response indicates a known or new user issue, the routine 800 moves to block 810. In some embodiments, the virtual avatar interaction system 215 may determine that the user response does not indicate any issue. For example, the virtual avatar interaction system 215 may be providing prompts or responses to the user related to a user interest (e.g., baseball) and the user response may not contain information that may be associated with a user issue. In such embodiments, the routine 800 may move to block 822 and end, and may allow the conversation to continue without interruption or change in focus to analyze a user issue.

At block 810, the virtual avatar interaction system 215 generates an issue analysis question. As used herein, an "issue analysis question," may refer to a question, prompt, or natural language query directed to a user, that is generated to cause the user to provide additional information that may be useful in diagnostic analysis of a user issue or determining a type of assistance (e.g., emergency medical treatment, a visit from a caregiver, a wait and see approach, etc.) that should recommended to the user. In some embodiments, the issue analysis question may be part of a set of issue analysis questions stored by, or accessible to, the virtual avatar interaction system 215. At least a portion of the set of issue analysis questions may be based on standard diagnostic questions (e.g., from a diagnostic manual). For example, the virtual avatar interaction system 215 may have classified a user issue as an "stomach pain" type user issue. The virtual avatar interaction system 215 may then access diagnostic questions from the set of diagnostic questions that are associated with the "stomach pain" type user issue.

The virtual avatar interaction system 215 may access issue analysis questions from a stored set of issue analysis questions. The issue analysis questions may be stored, for example, in a database, as unordered text information (e.g., in a data lake), in a vectorized format, or in another format accessible to the virtual avatar interaction system 215. In some embodiments, the virtual avatar interaction system 215 may access the stored issue analysis questions by generating a query for the storage system storing the issue analysis questions. In some embodiments, the virtual avatar interaction system 215 may access the stored issue analysis questions by performing a vector search of the storage system. For example, the virtual avatar interaction system 215 may identify a potential issue based on the user response (e.g., based on sentiment analysis, keyword analysis, processing using the training of a machine learning model implemented by the virtual avatar interaction system 215, etc.). The virtual avatar interaction system 215 may then generate a query or search request for the issue analysis question storage system to access stored issue analysis questions. In some embodiments, the virtual avatar interaction system 215 may modify the existing issue analysis question, for example to personalize the question based on known user information. In some embodiments, a machine learning model of the virtual avatar interaction system 215 may be trained to generate issue analysis questions, for example based on training the machine learning model using previous existing issue analysis questions and labeled sample user responses that would relate to the existing issue analysis questions. In some embodiments, the virtual avatar interaction system 215 may access a second system, for example a remote computing system, that provides assessment or diagnostic functions and provide interaction between the user and the assessment or diagnostic system based in part on the generated issue analysis question (e.g., the generated issue analysis question may request information used by the remote system).

In some embodiments, the virtual avatar interaction system 215 may generate an issue analysis question using a machine learning model. The machine learning model may be selected from a plurality of machine learning models, each trained for different issue types or sets of issue types (e.g., mental health issues, gastroenterological issues, acute injury issues, etc.). For example, the virtual avatar interaction system 215 may receive a user response stating "I ate ice cream and my stomach hurts now." The virtual avatar interaction system 215 may have identified the issue as a "stomach" or "gastroenterological" issue (e.g., at block 806). In this example, the virtual avatar interaction system 215 may then apply the issue classification (e.g., stomach) as input to the machine learning model. The virtual avatar interaction system 215 may optionally apply at least a portion of the user response from which the issue was identified, at least a portion of a previous user response, or user information as input to the machine learning model to provide additional context or information for generating the issue analysis question. In response to the input, the machine learning model generates an issue analysis question.

When the issue analysis question has been generated, the virtual avatar interaction system 215 outputs the issue analysis question to cause the user to provide an analysis response. The virtual avatar interaction system 215 may generate the issue analysis question in various modalities to be output to the user. In some embodiments, the issue analysis question may be incorporated into a video generated by the virtual avatar interaction system 215 (e.g., the virtual avatar interaction system 215 may generate display information for a virtual avatar of the personalized companion that includes mouth movements for a face to simulate speaking the question to the user). In some embodiments, the issue analysis question may be used to generate audio information to be played by a speaker (e.g., of the robotic device 120 or user device 110). In some embodiments, the issue analysis question may be presented as text in an interactive graphical user interface provided to the user at least in part by the virtual avatar interaction system 215. In some embodiments, the issue analysis question may be presented to the user with a set of selectable options, from which the user may select at least one option as an analysis response to provide information responsive to the issue analysis question at block 812.

At block 812, the virtual avatar interaction system 215 receives an analysis response to the issue analysis question. The analysis response is information received from the user in response to an issue analysis question. In some embodiments, the virtual avatar interaction system 215 may receive the analysis response as text, or an interaction (e.g., the user selecting an option on a touchscreen), for example through an interactive graphical user interface provided at least in part by the virtual avatar interaction system 215. In some embodiments, the virtual avatar interaction system 215 may receive the analysis response as audio information generated by a microphone (e.g., of the user device 110 or robotic device 120) in response to an utterance by the user.

At block 814, the virtual avatar interaction system 215 analyzes the current user issue with which the issue analysis question is associated. The virtual avatar interaction system 215 may analyze the current user issue using a rules-based or keyword-based approach to determine issue information related to the current user issue. Issue information may include, for example, a classification of an issue type (e.g., a physical issue, psychological issue, orthopedic issue, acute issue, long-term issue, medical issue, emergency issue, etc.). In another example, issue information may include potential conditions, illnesses, or injuries associated with the issue. The potential conditions, illnesses, or injuries may be determined based on the user response, or based on additional information accessible to the monitoring and interaction control system 130 that may be used as part of a diagnostic process. In some embodiments, the issue information may include an indication of whether the current issue has been identified based at least in part on a point in time condition, change in an existing condition (e.g., longitudinal change), or a difference between the user and other similar users in a cohort. A rules, or keyword, based approach may be based at least in part on a diagnostic manual related to diagnosing medical conditions. Further, analyzing the current issue may include identifying a specific issue (e.g., lung infection, bone break or fracture, allergic reaction, etc.) currently affecting the user.

In some embodiments, the virtual avatar interaction system 215 may analyze the current user issue using a machine learning model (e.g., stored by the machine learning data store 235 or accessed from the machine learning model provider system 195). The machine learning model may be trained to provide an indication of at least one likely issue affecting a user, or may be provided access to additional information (e.g., from the historical data system 180, or from another information storage system storing medical diagnostic information) for use in generating a response. In some embodiments, the user response may be provided as input to a machine learning model, along with additional information available to the monitoring and interaction control system 130, to cause the machine learning model to generate an output. The output of the machine learning model may include the identification of the user issue, and may include additional issue information (e.g., the issue type, issue severity, a confidence in the accuracy of the output, etc.). In some embodiments, the virtual avatar interaction system 215 may provide additional prompt information as part of the input to the machine learning model. For example, the additional prompt information may include a desired output format for the output of the machine learning model, one or more restrictions on the output of the machine learning model (e.g., a restriction to not provide medical advice, to include a notice to seek medical attention, to not refer to any indication of a medical condition as a diagnosis, to not recommend the use of a medication, etc.), an indication of information accessible to the machine learning model to be used when generating the output, and the like.

At block 816, the monitoring and interaction control system 130 updates information associated with the known user issue. For example, the monitoring and interaction control system 130 may update user information of the activity information collection system 170, historical data system 180, or another storage location storing user information (e.g., a medical provider system). In some embodiments, the update may include at least one of a date of the additional information for the user issue being received or generated, an indication of a change in the known user issue (e.g., progression of an existing disease, recovery from an injury, etc.).

At block 818, the virtual avatar interaction system 215 generates an issue response recommendation. The issue response recommendation may include one or more actions that can be taken to address the identified user issue. The one or more actions may be actions performable by a computing system (e.g., the monitoring and interaction control system 130, user assistance device 160, user device 110, etc.), a robotic system (e.g., the robotic device 120), a caregiver, the user, or another individual. The one or more actions may each individually address at least a portion of the user issue, or may address the user issue when executed in combination. Where a plurality of actions are included in the response recommendation, the response recommendation may include an indication of an order (e.g., user action 1 is followed by robotic device action 1 and then followed by user action 2), or timing (e.g., action 2 should occur between 5 and 10 minutes following action 1), of each action. In some embodiments, the virtual avatar interaction system 215 may generate a plurality of issue response recommendations. For example, the virtual avatar interaction system 215 may generate a first issue response recommendation directed to a healthcare provider, and a second issue response recommendation directed to the robotic device 120.

In some embodiments, the issue response recommendation may be generated by a machine learning model of the monitoring and interaction control system 130. In additional embodiments, the issue response recommendation may be identified by the monitoring and interaction control system 130 from a set of issue response recommendation options. The selection of an issue response recommendation from the set of issue response recommendations may be determined, for example, based on the issue type, user response, or issue information generated by the monitoring and interaction control system 130.

In some embodiments, the issue response recommendation may be internal to the monitoring and interaction control system 130. For example, the virtual avatar interaction system 215 may determine a change in a user's mood, such as agitation, anxiety, or the like (e.g., at decision block 808) and the virtual avatar interaction system 215 may adjust further responses generated for the user based on the change in the user's mood. Further responses generated based on the change in the user's mood may be generated to calm the user, cause the user to provide additional information related to the change in mood, or improve communications between the virtual avatar interaction system 215 and the user.

At block 820, the monitoring and interaction control system 130 initiates a user response action. In some embodiments, the monitoring and interaction control system 130 may generate user interface information (e.g., via the user interface subsystem 205, or virtual avatar interaction system 215) to provide the user response action to the user via the user interface 280. The user response action may be provided as visual information (e.g., an image or video displaying how to perform the user response action), audio information (e.g., a generated voice providing the user response action via a speaker of the user interface 280), text information (e.g., text generated by a machine learning model instructing the user), or multimodal information incorporating information in two or more modalities (e.g., text and image information). In some embodiments, the monitoring and interaction control system 130 may cause another system or device to execute the user response action. For example, the monitoring and interaction control system 130 may provide instructions to the robotic device 120 to cause the navigation controller 255 to navigate the robotic device 120 to a location where the action may be executed. The monitoring and interaction control system 130 may provide instructions to cause the robotic device 120 to actuate a motor (e.g., connected to a robotic arm or other moveable part) and perform additional actions in the real world (e.g., moving a medication for the user, taking a picture of the user or an object using an image sensor of the one or more sensors 265, etc.). In some embodiments, the user response action may be provided to a caregiver or other person (e.g., the monitoring and interaction control system 130 may contact an emergency service to assist the user).

In some embodiments, the user response action may include providing a treatment to a user. For example, a treatment may include providing a medication associated with a known user medical condition (e.g., providing a rescue inhaler to an asthmatic patient, a blood pressure medication to a user with high or low blood pressure, a anaphylaxis medication to a user with a severe allergy, etc.), providing a medication to assist a user unrelated to a known user medical condition (e.g., providing a sedative to a patient having difficulty sleeping, an allergy medication to a user having an acute allergic reaction, a stool softener to a user with constipation, etc.) In some embodiments, the user response action may include taking no action, for example to gather additional user information useful for determining an appropriate response action. In some embodiments, the user response action may include requesting a user assistance device 160 or robotic device 120 for the user, and may include providing instructions to the user assistance device 160 or robotic device 120 to gather additional sensor information related to the user. For example, the user response action for a patient with dizziness when standing may include causing the robotic device 120 to bring a blood pressure monitor to the user, or applying a blood pressure sensor to the user. When the monitoring and interaction control system 130 has initiated the user response action, the routine 800 moves to block 822 and ends.

Figure 9:
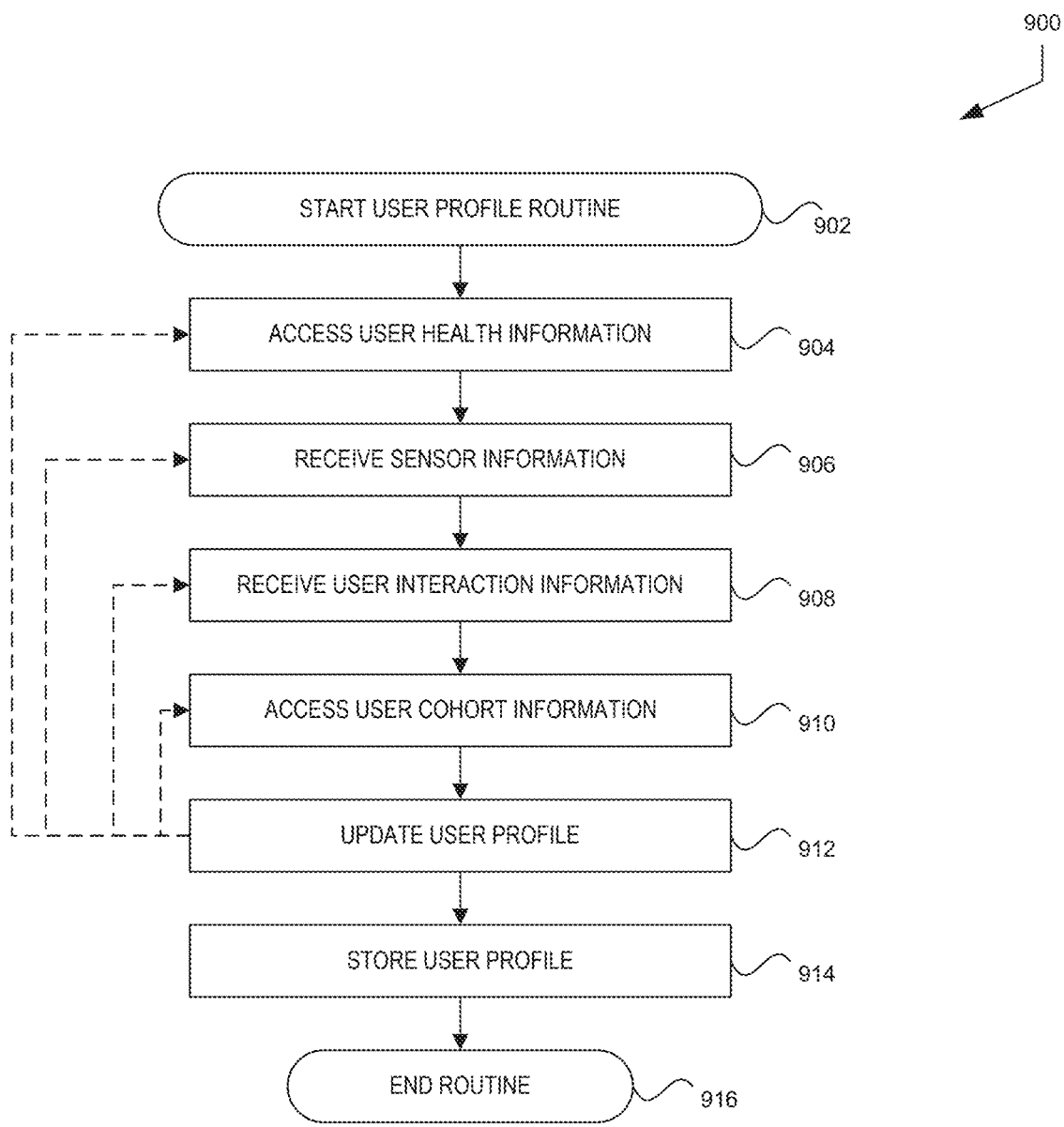
FIG. 9 is a flow diagram of an illustrative routine for personalizing a vitality monitoring and analysis system according to some embodiments.

FIG. 9 illustrates an example routine 900 for generating or updating a user profile associated with a user to be used by the monitoring and interaction control system 130, for example to personalize interactions between the monitoring and interaction control system 130 and the user. The routine 900 begins at block 902, for example in response to for example in response to a new user being registered with the monitoring and interaction control system 130 as a user to be monitored. In some embodiments, the routine 900 may run, in whole or in part, in response to receiving updated or additional information associated with the user.

At block 904, the monitoring and interaction control system 130 accesses user health information. The monitoring and interaction control system 130 may access the user health information from the activity information collection system 170, historical data system 180, or from another system (e.g., a healthcare provider system associated with the user). In some embodiments, user health information may be obfuscated (e.g., deidentified, encrypted, etc.). The monitoring and interaction control system 130 may then request or access a stored user credential providing access to the user health information.

At block 906, the monitoring and interaction control system 130 receives sensor information from a sensing device 140 in communication with the monitoring and interaction control system 130. The sensor information may be generated by any sensor type of the sensing device 140. In some embodiments, sensor information from two or more different sensor types may be in a different format. The monitoring and interaction control system 130 may then modify at least a portion of the sensor information to associate sensor information from different sensors. For example, time information may be provided by a first sensor in a first format (e.g., day, month, year, hour in 24-hour time, minute, and second as DD/MM/YYYY: HH/MM/SS) and by a second sensor in a second format (e.g., month, day, year, hour in 24-hour time, and minute as MM/DD/YYYY: HH/MM). The monitoring and interaction control system 130 may then harmonize the time information so that sensor information from the first sensor and the second sensor can be associated based on a time the sensor information was generated (e.g., by using the time information from a sensor with the lowest time resolution). The monitoring and interaction control system 130 in such embodiments may additionally store the sensor information in the original format, which may allow the monitoring and interaction control system 130 to more efficiently process sensor information from the same sensor or sensor type. In further embodiments, the monitoring and interaction control system 130 may receive power information from the power sensing device 190. For example, the monitoring and interaction control system 130 may receive power information for the user's residence and generate a power use model for the user based on the power used by the residence at different times and on different days. The power use model may be used, for example, to determine whether the user's fridge has been left open (e.g., based on excess power usage at a time indicating that the fridge has been operating for longer than expected).

At block 908, the monitoring and interaction control system 130 receives user interaction information. The monitoring and interaction control system 130 may receive the user interaction information from a user assistance device 160. For example, where the user assistance device 160 is a medication dispensing device, the user interaction information may indicate a time at which the user collected the dispensed medication. The monitoring and interaction control system 130 may receive user interaction information from the robotic device 120. For example, the user may request the robotic device move to the user's kitchen and provide an image of the user's stove via the user device 110 to allow the user to determine whether the stove has been left on. Such an interaction may be indicated by the robotic device 120 to the monitoring and interaction control system 130. The monitoring and interaction control system 130 may then determine that if the user regularly makes such a request, the request may indicate a memory issue. Such a determination may be made, for example, based on frequency analysis of a user's past actions (e.g., as included in the user activity pattern) and a current user interaction information, comparison to past requests received from a user (e.g., if a user asks about the outside temperature multiple times in a short period this may indicate memory problems), or comparison to cohort information of a cohort associated with the user.

At block 910, the monitoring and interaction control system 130 accesses user cohort information. The monitoring and interaction control system 130 may access the user cohort information from the cohort historical data store 184 of the historical data system 180. To access the correct user cohort information, the monitoring and interaction control system 130 may use other user information accessible to the monitoring and interaction control system 130. For example, the monitoring and interaction control system 130 may determine the user's sex, age, socioeconomic status, location of residence, location of birth, educational attainment, and the like in order to identify similar individuals that may form a cohort.

At block 912, the monitoring and interaction control system 130 updates the user profile. Updating the user profile may include updating a user activity pattern stored by the activity information data store 175 of the activity information collection system 170. In some embodiments, the user profile may be the user activity pattern. In some embodiments, for example where there is no existing user profile, the monitoring and interaction control system 130 may generate a new user profile. Updating the user profile by the monitoring and interaction control system 130 may include modifying information about the user (e.g., the user's height, age, activity timing, etc.), or adding new information about the user (e.g., a new activity, a new user assistance device 160, etc.) to the user's profile. When the user's profile has been updated, the routine 900 may return to any of blocks 904-912 as part of continuous monitoring of the user by monitoring and interaction control system 130.

At block 914, the monitoring and interaction control system 130 stores the user profile, for example in the activity information data store 175 of the activity information collection system 170 or in the user historical data store 182 of the historical data system 180. When the monitoring and interaction control system 130 has stored the user profile, the routine 900 moves to block 916 and ends.

Example User Interaction Interfaces

FIGS. 10-15 are illustrations of example user interfaces for providing interactions between a user and a personalized companion (e.g., by the virtual avatar interaction system 215 of FIG. 2 above herein). In some embodiments, the user interfaces described with respect to FIGS. 10-15 may be presented via the user device 110, the user interface 250 of the robotic device 120, or by another computing system in communication with the monitoring and interaction control system 130. While the user interfaces described herein are presented as being displayed on a display of a computing device, some or all of the functionality of the user interfaces of FIGS. 10-15 may be provided in an alternative format, for example to assist a user with limited vision (e.g., due to partial or complete blindness). For example, at least a portion of the functionality of the user interfaces of FIGS. 10-15 may be provided via a speaker of a computing device. Further, while certain elements are described with respect to the user interfaces below, it should be understood that elements may be in different locations, or removed, in some embodiments.

Figure 10:
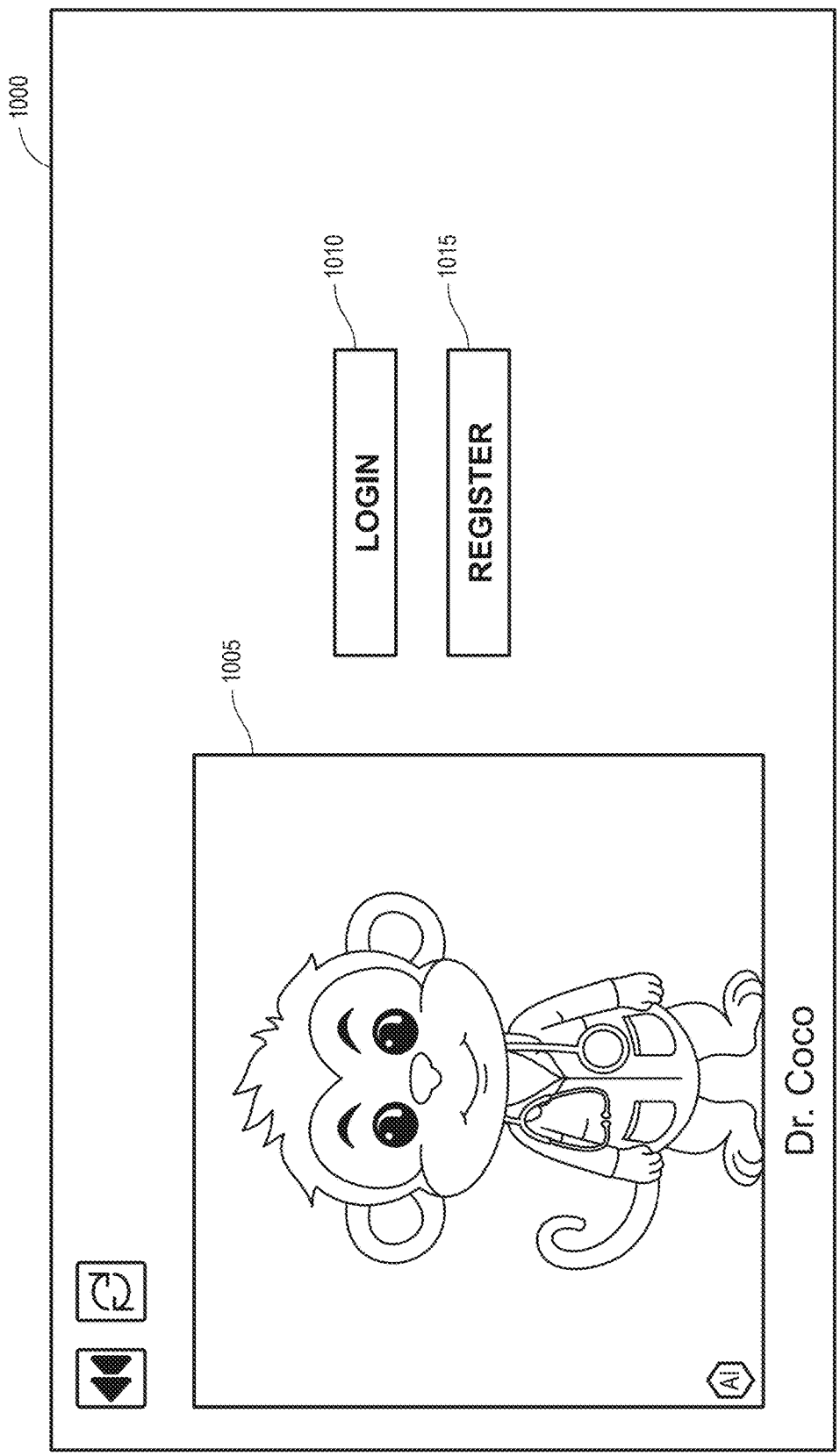

FIG. 10 illustrates an example user interface 1000 for allowing a user to register with the monitoring and interaction control system 130 to generate a personalized companion using the register button 1015. The user interface 1000 further allows the user to log in to the monitoring and interaction control system 130 to access an existing personalized companion using the login button 1010.

Additionally, the user interface 1000 of this example includes a virtual guide 1005 that may provide assistance to the user. For example, the virtual guide 1005 may describe a functionality of the personalized assistant, a registration process for generating a new personalized assistant for the user, a login process for accessing a previously-generated personalized assistant associated with the user, or provide other information related to the use and functionality of the personalized assistant. The virtual guide 1005 may provide visual guidance using images or video presented to the user. Further, the virtual guide 1005 may provide guidance via audio using a speaker of a computing device, which may be the same or different computing device with which the user is interacting with the user interface 1000. Input from the user may be received by the user interface 1000, for example, by the user interacting with a touchscreen display, a mouse, a keyboard, a microphone (e.g., by converting an utterance of the user received by the microphone to an instruction that can be applied to the user interface 1000), or by any other input device in communication with the monitoring and interaction control system 130. In some embodiments, the virtual guide 1005 may be provided by the virtual avatar interaction system 215 of the monitoring and interaction control system 130. In such embodiments, the machine learning model used to provide the virtual guide 1005 may be the same or a different machine learning model than the machine learning model associated with the personalized companion.

Figure 11:
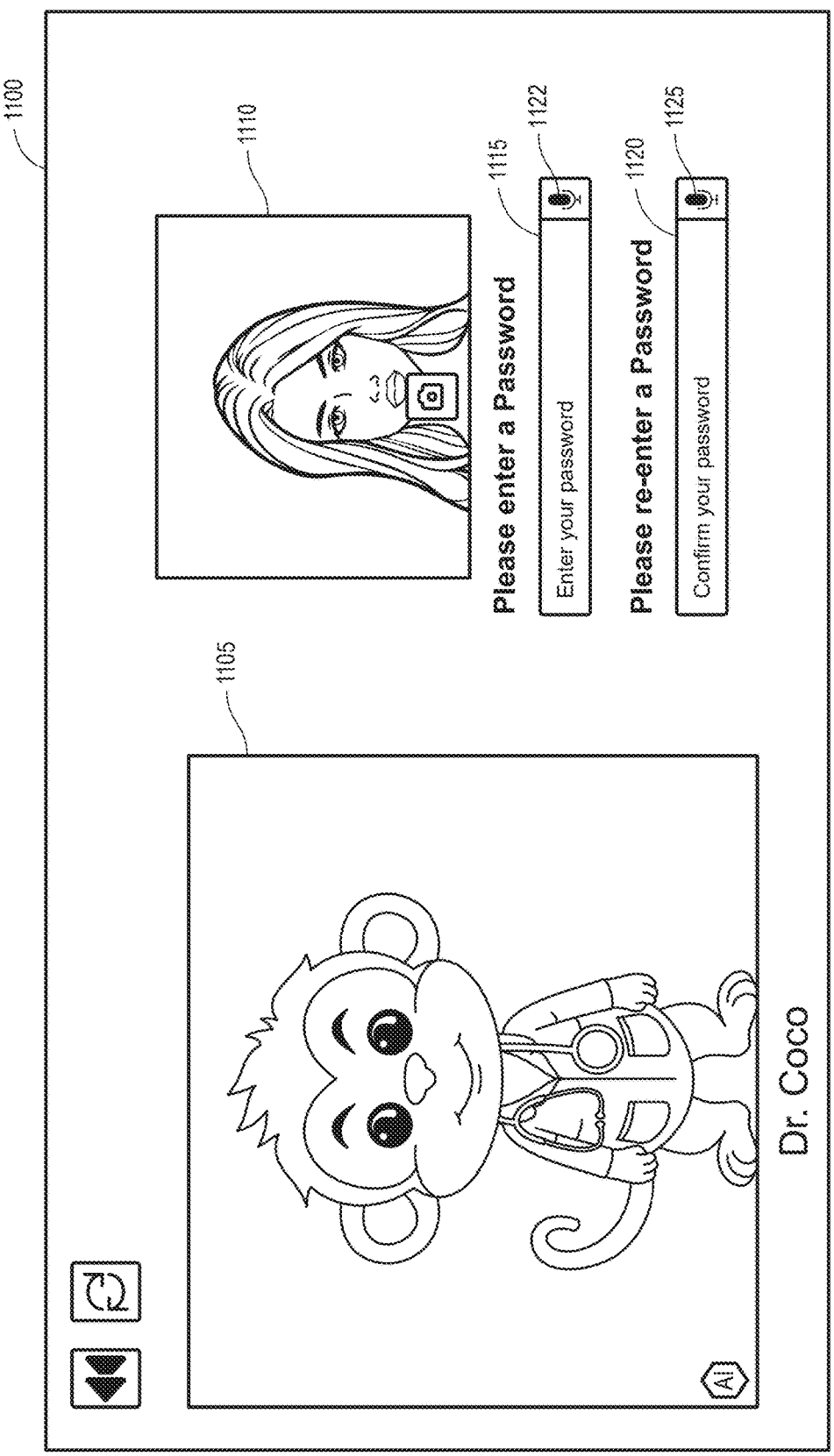

FIG. 11 illustrates an example user interface 1100 for user verification setup (e.g., as described in relation to block 604 of routine 600 above herein). The user interface 1100 of this example includes a virtual guide 1105, an identification image preview area 1110, password entry areas 1115 and 1120, and voice command option buttons 1122 and 1125.

The virtual guide 1105 may be the virtual guide 1005 described above herein. In this example, the virtual guide 1105 may provide audio or image information to the user (e.g., via a display of the user device 110 or the robotic device 120) related to registering the user with the monitoring and interaction control system 130 to generate a personalized companion. Further, the virtual guide 1105 may provide assistance to the user in case of an error (e.g., by directing the user to contact support personnel, by allowing the user to interact with a machine learning model having access to support information, etc.).

The identification image preview area 1110 allows the user to view an image captured by a camera (e.g., of the user device 110 or robotic device 120) that is intended for future use to identify the user to the monitoring and interaction control system 130.

The password entry areas 1115 and 1120 allow the user to provide a chosen password to the monitoring and interaction control system 130. The password may be used as part of an identification process to ensure the user's access to the monitoring and interaction control system 130, and information associated with the user stored by the monitoring and interaction control system 130, is protected by limiting access to the user's information and personalized companion unless the selected password is entered at a login.

The voice command option buttons 1122 and 1125 allow for a user to choose to enter information for the user interface 1100 by a microphone of a computing device (e.g., the user device 110 or robotic device 120). When selected, the voice command option buttons 1122 or 1125 may allow a computing system to detect an utterance of the user via a microphone of the computing system, and convert the utterance to text. The text generated based on the utterance may then be entered automatically into the password entry area 1115 or 1120 associated with the respective voice command option button 1122 or 1125.

Figure 12:
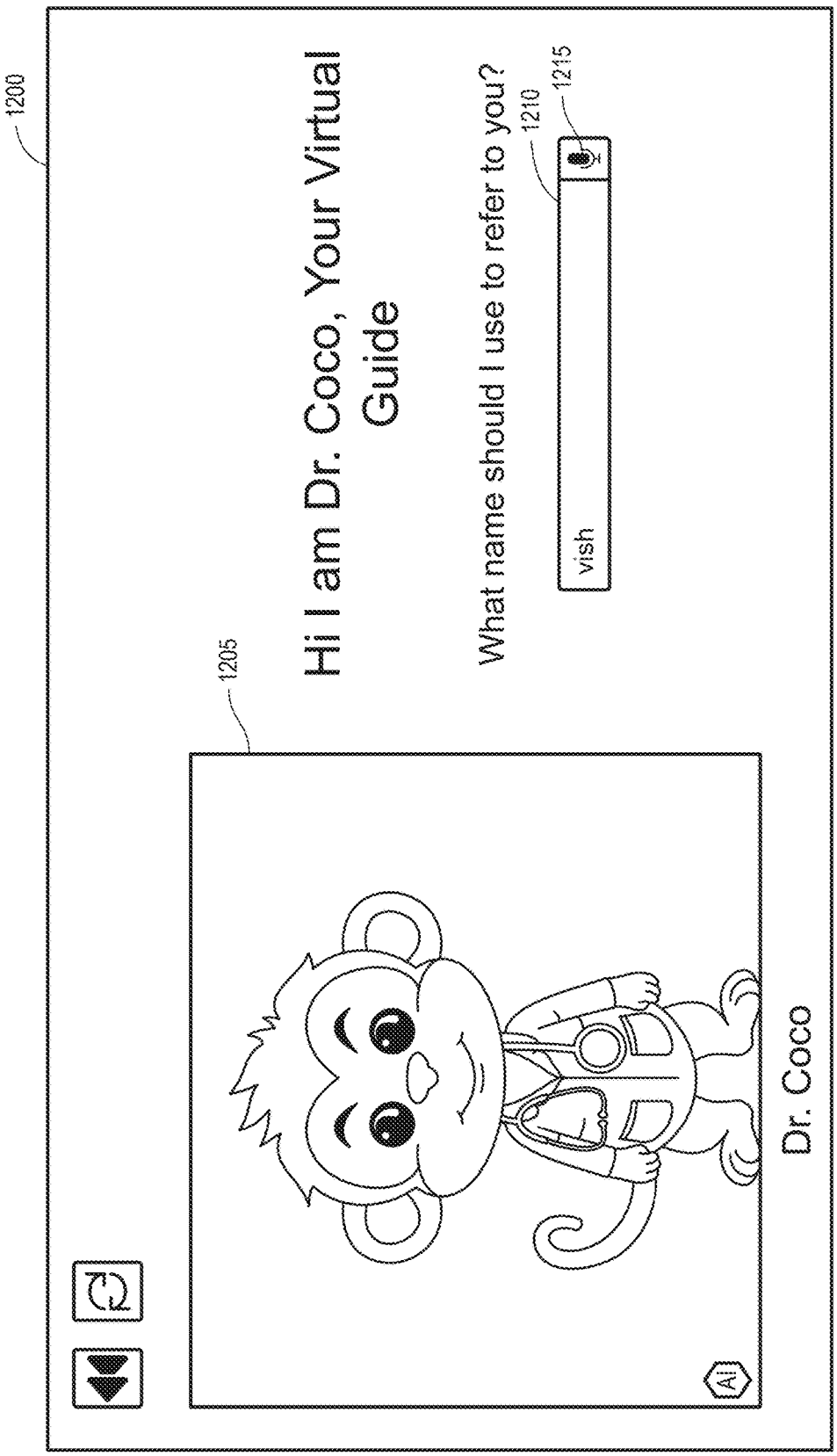

FIG. 12 illustrates an example user interface 1200 for receiving a user preference information (e.g., a username) for use in generating a personal companion for a user (e.g., at block 610 of routine 600 described previously herein). The user interface 1200 of this example includes a virtual guide 1205, a user preference entry portion 1210, and a voice command option button 1215. While in this example user interface 1200, a preferred name is being requested from the user by the user interface 1200, it should be understood that a similar user interface 1200 may be used to request other information from the user. For example, the user interface 1200, in some embodiments, may request a location of the user, contact information for an emergency contact for the user, a preferred pharmacy location, a preferred medical provider, or other information which may be useful for providing assistance or improved interactions with the user.

The virtual guide 1205 may be similar to the virtual guide 1005 or virtual guide 1105 described previously herein. In this example user interface 1200, the virtual guide 1205 may provide instructions to the user to cause the user to provide a preferred name to be associated with the user by the monitoring and interaction control system 130. The preferred name may be used by the personalized companion provided by the virtual avatar interaction system 215 when interacting with the user.

The user preference entry portion 1210 allows the user to enter a user preference, for example via a touchscreen or keyboard of the user device 110 or robotic device 120. In some embodiments, the text information received from the user may be in the form of a link to additional information (e.g., a location in a storage of the user device 110 where a list of user preferences is stored in a text file). The link provided by the user may indicate a remote computing system from which user preference information may be accessed (e.g., as a hypertext transit protocol link).

The voice command option button 1215 may function similarly to the voice command option buttons 1122 and 1125 described above herein.

Figure 13:
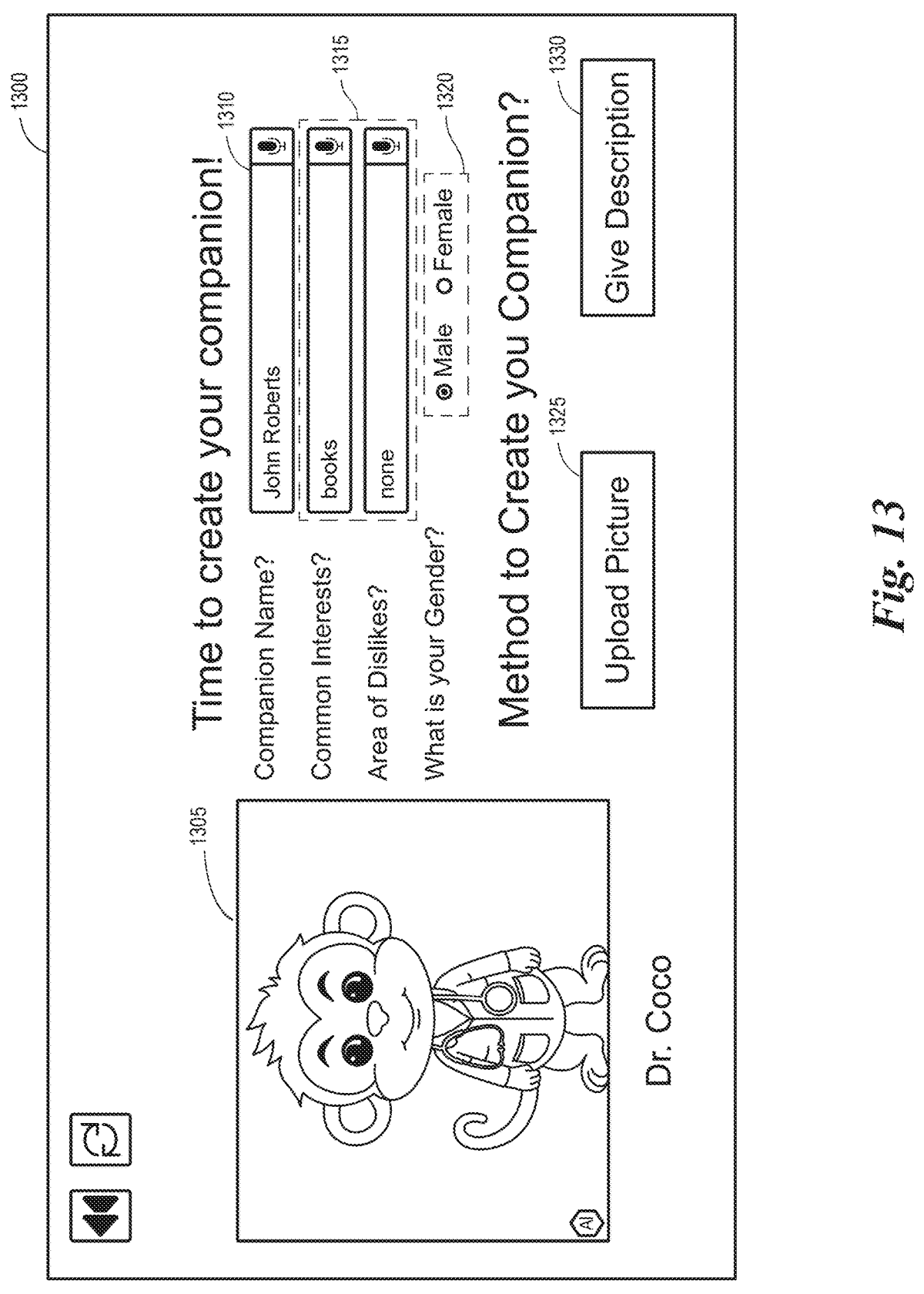

FIG. 13 illustrates an example user interface 1300 for receiving additional user preference information for use in generating a personal companion for a user (e.g., at block 610 of routine 600 described previously herein). The user interface 1300 of this example includes a virtual guide 1305, a companion name entry portion 1310, user information entry portions 1315, user preference radio buttons 1320, a picture upload option 1325, and a description entry option 1330.

The virtual guide 1305 may be similar to the virtual guide 1005, virtual guide 1105, or virtual guide 1205 described previously herein. In this example user interface 1300, the virtual guide 1305 may provide instructions to direct the user to enter additional user information. The additional user information may be used by the monitoring and interaction control system 130 to customize the personalized companion for the user (e.g., by modifying a prompt instructing a machine learning model).

The companion name entry portion 1310 allows the user to enter a preferred name for the personalized companion. Additionally, the companion name may be used by the monitoring and interaction control system 130 generally to allow the user to interact with the monitoring and interaction control system 130 as a unified system (e.g., by associating user interactions with the system with the companion name). For example, where the companion name selected by the user is "Bob," the user may request that the robotic device 120 move to a location by uttering "Bob, please go to the kitchen." The robotic device 120 may then, based on determining that the user has uttered the companion name (e.g., by detecting the utterance with a microphone of the robotic device 120 and comparing at least a portion of the utterance to the stored companion name), follow the instruction and move to the user's kitchen.

The user information entry portions 1315 allow for the user to provide additional user information to the monitoring and interaction control system 130. In this example user interface 1300, the user may provide one or more interests, and one or more dislikes, to the monitoring and interaction control system 130. The monitoring and interaction control system 130 may then use this information when generating the personalized companion, for example by having the personalized companion discuss topics of interest with the user or avoid areas of dislike when conversing with the user.

The user preference radio buttons 1320 allow the user to make a selection from pre-existing options provided by the monitoring and interaction control system 130 through the user interface 1300.

The picture upload option 1325 allows the user to provide an image from which the monitoring and interaction control system 130 will generate image, video, and motion information for providing the personalized companion. The monitoring and interaction control system 130 may use a machine learning model to generate analyze the provided image and generate an output. For example, the machine learning model may generate a deformable skeleton and animation information for the deformable skeleton, and then overlay a generated mesh similar to the provided image on the deformable skeleton in order to provide a video associated with the personalized companion that reacts and moves in a manner similar to that of a real person.

The description entry option 1330 allows the user to provide a description of an image from which the monitoring and interaction control system 130 will generate image, video, and motion information for providing the personalized companion. In some embodiments, the monitoring and interaction control system 130 may provide the description as input to a machine learning model to cause the machine learning model to generate a proposed companion image, as described below in relation to FIG. 14.

Figure 14:
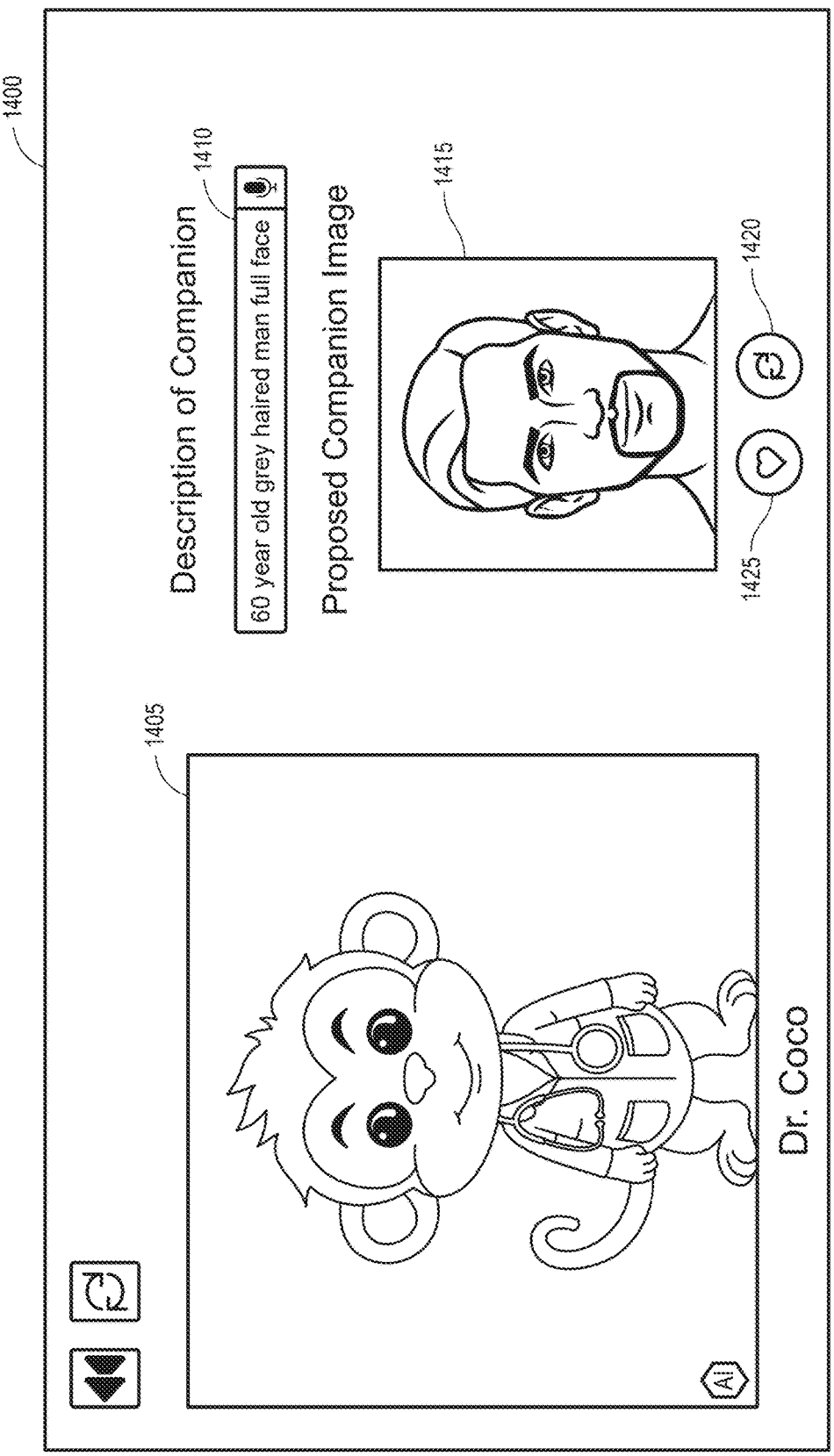

FIG. 14 illustrates an example user interface 1400 for generating a personalized companion image 1415 based on a user description entry area 1410. The user interface 1400 of this example further includes a virtual guide 1405, an accept image button 1425, and a request new image button 1420.

The virtual guide 1405 may be similar to the virtual guide 1005, virtual guide 1105, virtual guide 1205, or virtual guide 1305 described previously herein. In this example user interface 1400, the virtual guide 1405 may provide instructions to direct the user to enter information to describe a preferred companion image for the personalized companion.

The user description entry area 1410 allows the user to provide a description of the preferred companion image. Where the user selects to provide the description by voice (e.g., by speaking to a microphone of the user device 110 or robotic device 120), the user description entry area 1410 may populate with text generated based on the user's utterance describing the companion image. In some embodiments, the user may upload an image as part of describing the preferred companion image.

The personalized companion image 1415 is a sample image of the personalized companion which, if accepted, may be used to generate additional image, video, or motion information to animate the personalized companion during interactions with the user. The personalized companion image 1415 may be an image generated by a machine learning model in response to the user description entry area 1410.

The request new image button 1420 allows the user to request a new image for the companion be generated by the monitoring and interaction control system 130. The new image may be generated based on the previously-used user description entry area 1410, or an updated user description entry area 1410 that has been updated by the user after the previous personalized companion image 1415 was generated.

The accept image button 1425 allows the user to accept the personalized companion image 1415 as the image to be used for the personalized companion. The monitoring and interaction control system 130 may, in response to selection of the accept image button 1425, generate image, video, or animation information to generate an animation for the personalized companion during interaction with the user.

Figure 15:
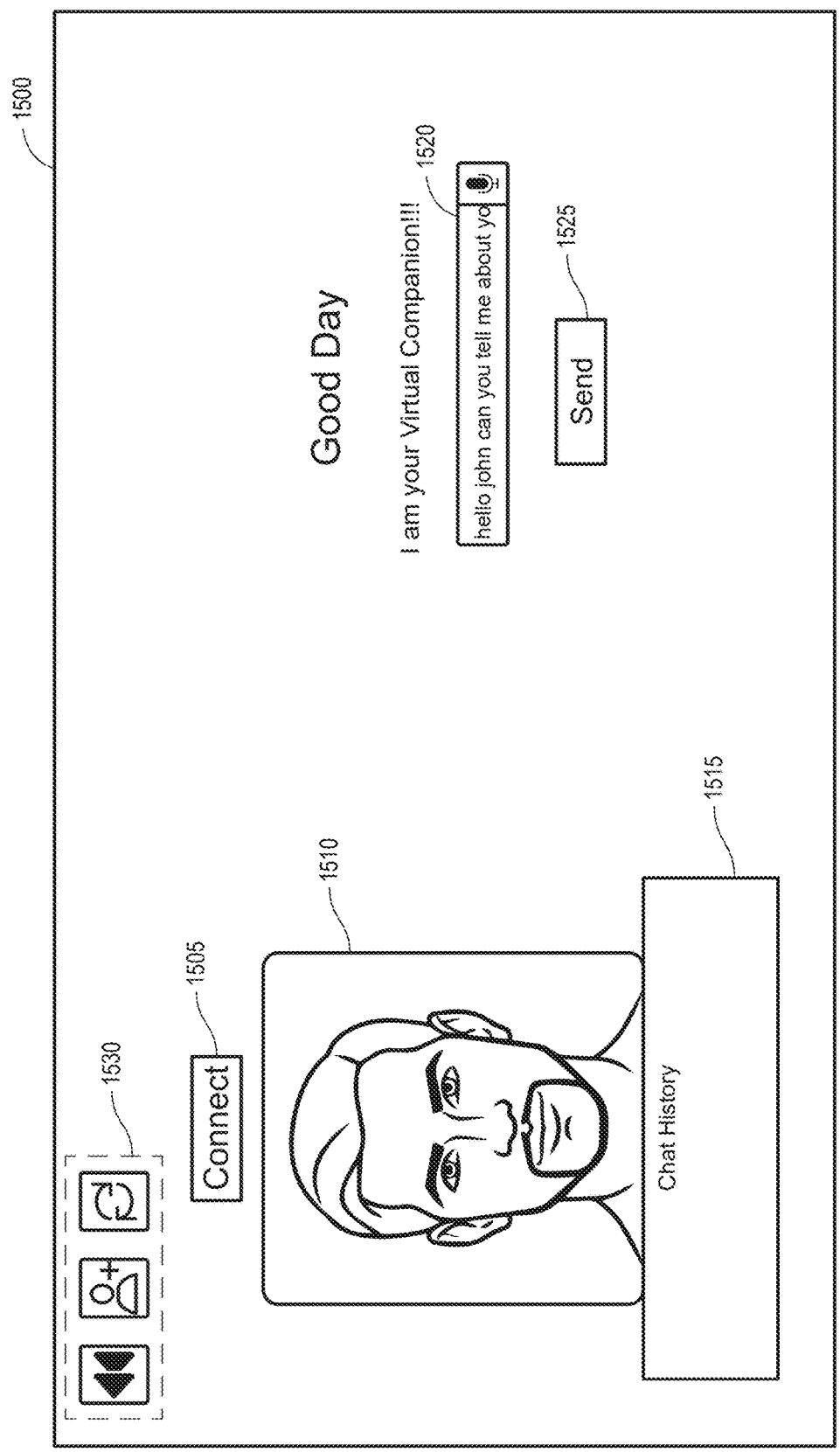

FIG. 15 illustrates an example user interface 1500 for providing user interactions with a personalized companion (e.g., as described with respect to routine 700 previously herein). The user interface 1500 of this example includes a request connection button 1505, a companion display 1510, a chat history 1515, a user input portion 1520, a send message button 1525, and a set of control options 1530.

The request connection button 1505 allows a user to establish a connection between the user interface 1500 and the monitoring and interaction control system 130 to provide functionality of the user interface 1500. The request connection button 1505 may be used, for example, when a user has not interacted with the personalized companion provided by the virtual avatar interaction system 215 for a threshold amount of time, leading the monitoring and interaction control system 130 to temporarily disconnect the virtual avatar interaction system 215 from the user interface 1500 to reduce the use of the computing resources providing the personalized companion. The computing resources that would otherwise be used to provide interactions with the personalized companion for the virtual avatar interaction system 215 may instead be used to perform other functions of the monitoring and interaction control system 130.

The companion display 1510 displays an image, or video, of the personalized companion. The image or video may be generated by the virtual avatar interaction system 215 based on the previously-stored image information (e.g., generated through interaction between the user and the user interface 1400 or user interface 1300 described above herein).

The chat history 1515 may provide text output generated by a machine learning model of the virtual avatar interaction system 215, for example in response to a request to connect received by the virtual avatar interaction system 215 based on user interaction with the request connection button 1505, or based on user input received in text or audio form (e.g., via the user input portion 1520).

The user input portion 1520 allows a user to provide input, such as a question or comment, to the personalized companion. The user input may be in text or audio (e.g., an utterance converted to audio information by a microphone of the user device 110 or robotic device 120) form. The user input may be provided to the virtual avatar interaction system 215 to allow for user interaction with the personalized companion. The user input may be provided to the virtual avatar interaction system 215 as text information or audio information.

The send message button 1525 allows a user to indicate that the information provided in the user input portion 1520 is to be provided a input for the personalized companion. For example, the user interacting with the send message button 1525 may cause the device presenting the user interface 1500 to the user (e.g., the user device 110 or robotic device 120) to transmit the user input to the monitoring and interaction control system 130.

The set of control options 1530 allow a user to interact with the monitoring and interaction control system 130 for functions not provided by the personalized companion. For example, the set of control options 1530 of this user interface 1500 allow the user to return to a previous window, refresh the current window, or initiate a new session with the monitoring and interaction control system 130.

Example Monitoring and Control Interfaces

FIGS. 16-19 illustrate example interfaces for interacting with a monitoring and control system 130 providing services to one or more users. The example user interfaces 1600-1900 may enable a supervising user (e.g., a caregiver, healthcare provider, etc.) to quickly assess a status of various users associated with the monitoring and interaction control system 130, or to efficiently identify alerts which may require a response by the supervising user or further escalation.

Figure 16:
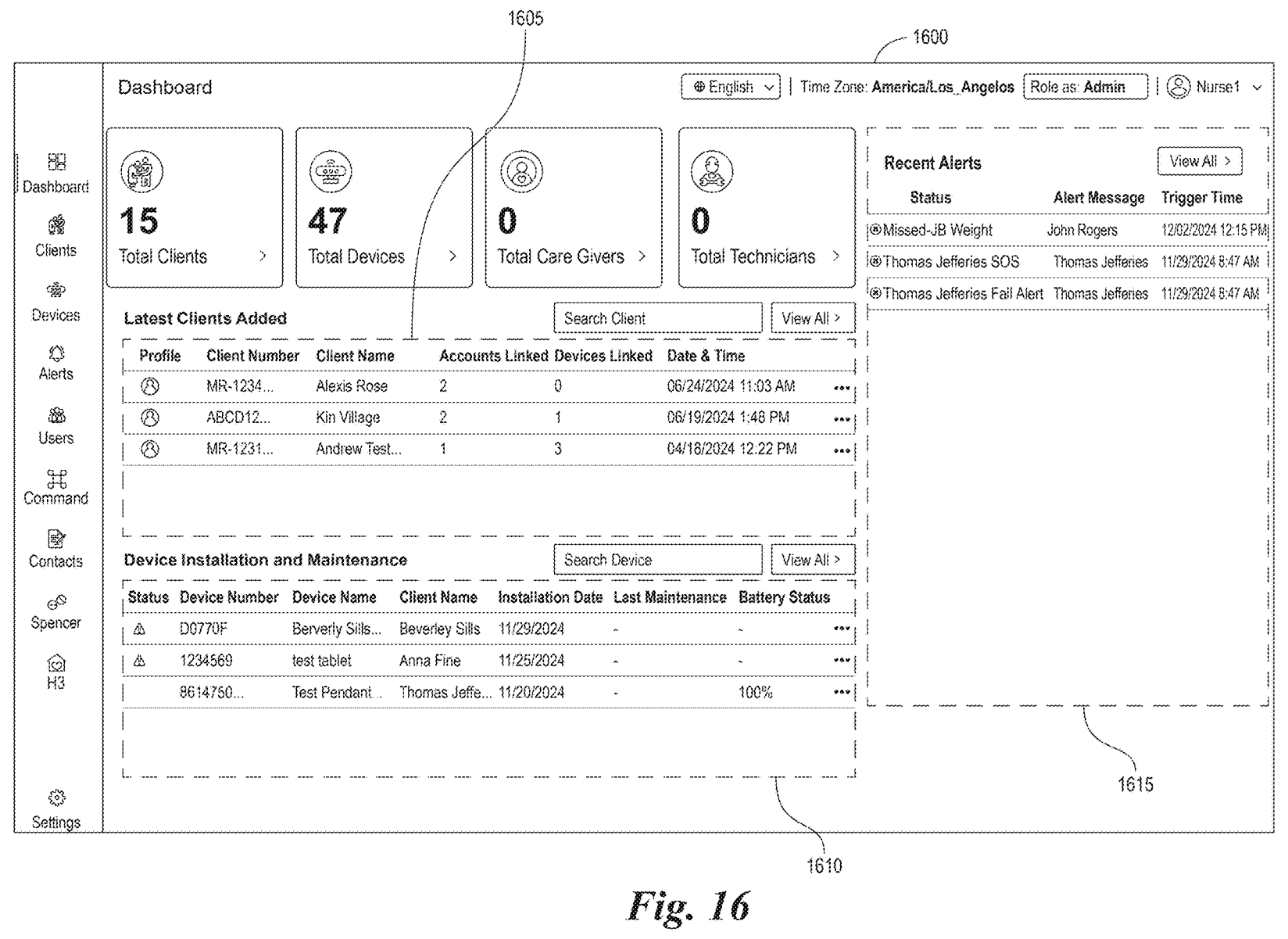

FIG. 16 illustrates an example user interface 1600 for displaying recent information related to the monitoring and interaction control system 130. The user interface 1600 of this example includes a list of recently added users 1605, a list of devices 1610, and a list of recent alerts 1615.

The list of recently added users 1605 provides a listing of new users added to the system. Additional information associated with each user is provided as part of the record for each user, as seen in the list of recently added users 1605. The additional information in this example user interface 1600 includes a client number (e.g., a user identifier that may uniquely identify the client anonymously or pseudonymously), a full name of the client, a number of user accounts associated with the client, a number of devices associated with the client (e.g., a number of sensing device 140, user assistance device 160, personal alert device 165, robotic device 120, etc. in communication with the monitoring and interaction control system 130 to provide information associated with the user or allow the user to interact with a personalized companion of the virtual avatar interaction system 215), and a timestamp indicating the time when the user was registered with the monitoring and interaction control system 130 for monitoring.

The list of devices 1610 is a list of devices (e.g., robotic device 120, sensing device 140, user assistance device 160, personal alert device 165, etc.) in communication with the monitoring and interaction control system 130. Additionally, the list of devices 1610 may indicate when a device is in need of maintenance (e.g., battery replacement, full device replacement, etc.), a last maintenance date for a device, a battery status of a device, a user associated with a device, a device identifier uniquely identifying the device, and a date when the device was installed at a location associated with a user.

The list of recent alerts 1615 displays a set of alerts generated by the monitoring and interaction control system 130. The alerts are associated with a user associated with the monitoring and interaction control system 130. In this example list of recent alerts 1615, alert information is provided for each alert including an identification of the cause of the alert, a user associated with the alert, and a time at which the alert was generated by a device (e.g., a robotic device 120, sensing device 140, user assistance device 160, personal alert device 165, etc.) or a time at which the alert was received at the monitoring and interaction control system 130.

Figure 17:
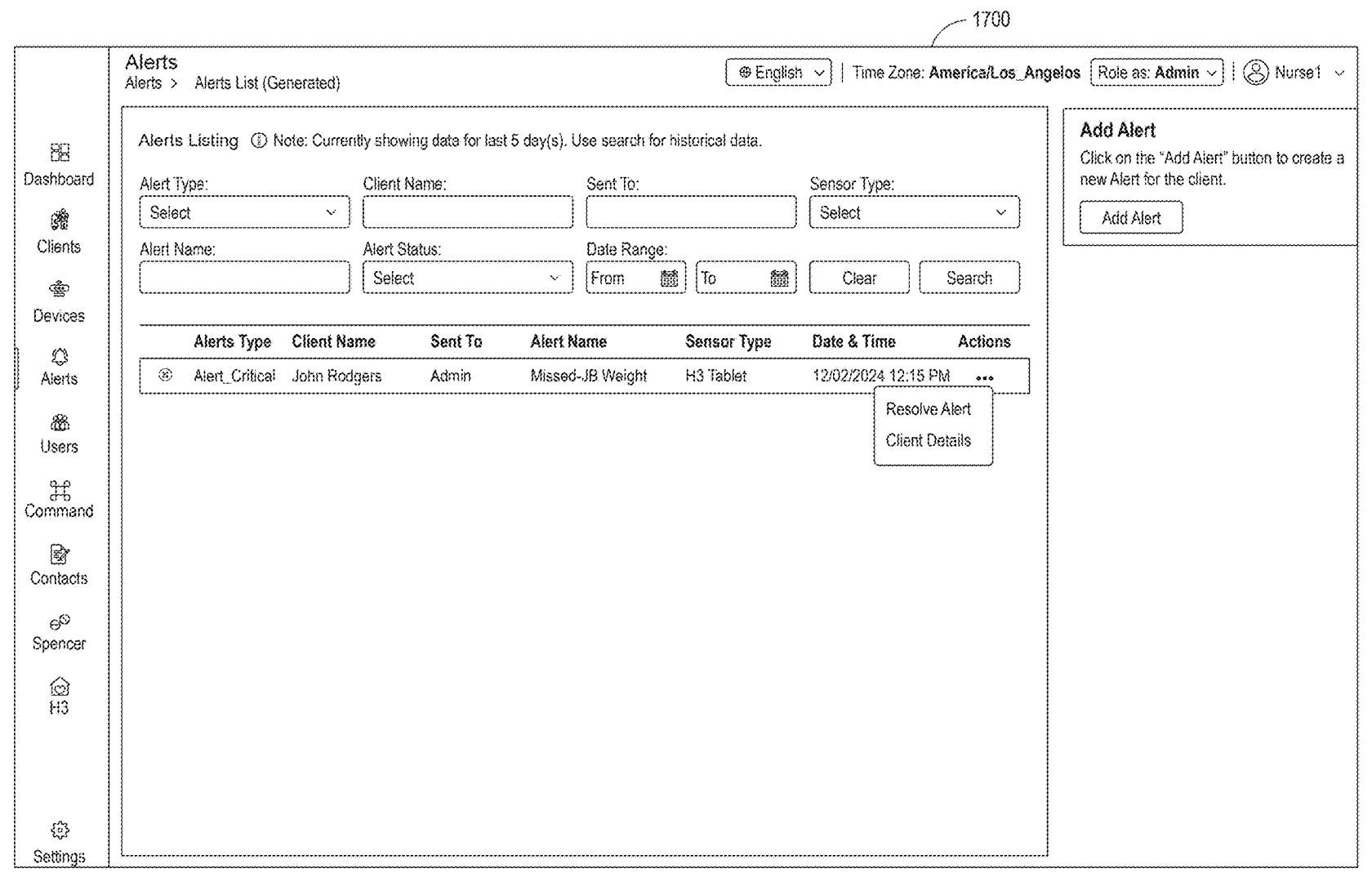

FIG. 17 illustrates an example user interface 1700 for reviewing alert information received or generated by the monitoring and interaction control system 130. The example user interface 1700 allows a supervising user (e.g., a healthcare provider, caregiver, etc.) to filter a set of alerts based on various portions of the alert information associated with each alert to view alert information for selected alerts from the set of alerts. For example, the set of alerts may be filtered based on an alert type (e.g., medical, psychological, acute, emergency, etc.), an alert name, an alert status (e.g., open, resolved, current, etc.), a client name of a user associated with an alert, a user or individual the alert was sent to (e.g., a caregiver, healthcare provider, etc.), a date range for when the alert was generated, received, or modified, or a sensor type that has generated the alert (e.g., any of the sensing device 140 described above herein). The user interface 1700 may further allow a supervising user to add an alert to the set of alerts. The user interface 1700 may provide a list of alerts that meet the criteria of the search, or a list of all available alerts (e.g., a scrollable list).

FIG. 18 illustrates an example user interface 1800 for displaying additional alert information generated or received by the monitoring and interaction control system 130. The user interface 1800 may be displayed in response to a supervising user selecting an alert from the list of recent alerts 1615, or user interface 1700. The user interface 1800 provides additional alert information for review by the supervising user, for example the user associated with the alert, a sensor type that has generated the alert, a name for the alert, a type of the alert, a unique alert identifier for the alert, and a unique identifier for the device or sensor that generated the alert. Further, the user interface 1800 may allow the supervising user viewing the alert information to select to resolve the alert. Resolving the alert may indicate to the monitoring and interaction control system 130 that the alert has been resolved (e.g., the alert no longer represents a current issue for the user that may require attention), or that the alert has been successfully escalated to an individual or system capable of assisting the user (e.g., that emergency services have been contacted in response to an alert having a critical alert type being reviewed by the supervising user).

Figure 19:
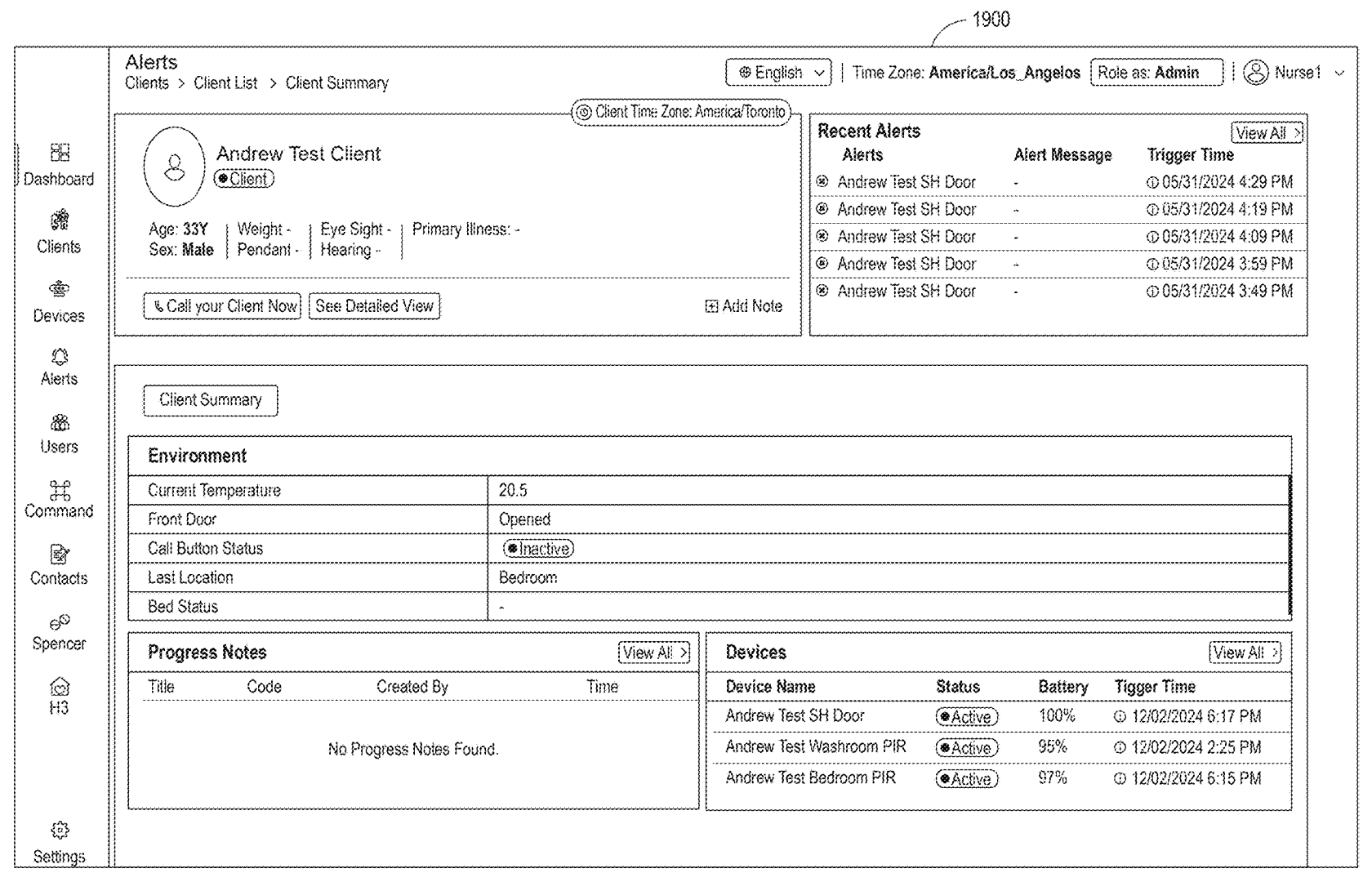

FIG. 19 illustrates an example user interface 1900 for displaying user information generated or accessed by the monitoring and interaction control system 130. The user interface 1900 may display the user information stored by, or accessible to, the monitoring and interaction control system 130 to a supervising user.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Examples of embodiments of the present disclosure can be described in view of the following clauses:

Clause 1. A patient monitoring and treatment method comprising:
  storing information about a user's condition in a standardized format in a set of one or more non-transitory storage devices, wherein the information about the user's condition represents a user activity pattern of a user;
  receiving sensor data from a plurality of different sensors, wherein individual sensors of the plurality of different sensors provide respective sensor data in a non-standardized format dependent on hardware or software used by the respective sensor;
  updating, by a computing system comprising one or more computer processors configured to execute specific instructions, the information about the user's condition in the standardized format based on analysis of the sensor data in one or more non-standardized formats to generate updated information about the user's condition in the standardized format, wherein the updated information about the user's condition indicates a change in the user activity pattern of the user;
  storing the updated information about the user's condition in the set of one or more non-transitory storage devices;
  automatically generating, by the computing system, a message comprising the updated information about the user's condition whenever updated information about the user's condition has been stored; and
  transmitting the message to one or more additional users over a computer network in real time, so that the one or more additional users have immediate access to up-to-date information about the user.

Clause 2. The patient monitoring and treatment method of clause 1 further comprising:
  accessing additional sensor data from at least one of the plurality of different sensors, wherein the additional sensor data is generated at a time after the sensor data is received; and
  comparing the additional sensor data to the updated information about the user's condition to generate a comparison result, wherein the comparison result indicates a change in the user's condition is outside of an expected threshold, and
  wherein the message further comprises the comparison result.

Clause 3. The patient monitoring and treatment method of clause 2 further comprising:
  determining, based on the comparison result, a user issue associated with the change in the user's condition;
  analyzing the user issue using a machine learning model to generate a response action; and
  executing the response action.

Clause 4. The patient monitoring and treatment method of clause 3, wherein the response action comprises transmitting an instruction to cause a user assistance device to provide a medication to the user.

Clause 5. The patient monitoring and treatment method of clause 1, wherein first sensor data is received from a first sensor of the plurality of different sensors, wherein second sensor data is received from a second sensor of the plurality of different sensors, and wherein the first sensor data and the second sensor data are in different formats.

Clause 6. The patient monitoring and treatment method of clause 1, wherein a first sensor of the plurality of different sensors is one of: a blood glucose monitor, a blood oxygen sensor, a blood pressure sensor, or a heart rate sensor.

Clause 7. The patient monitoring and treatment method of clause 1 further comprising:
identifying a cohort associated with the user, wherein the cohort is associated with cohort information; comparing the updated information to the cohort information to generate a comparison result;
determining, based on the comparison result, the updated information indicates the user's condition is outside of an expected range;
identifying a response action based on the comparison result; and
executing the response action.

Clause 8. The patient monitoring and treatment method of clause 7, wherein identifying the response action comprises:
determining, based on applying the updated information as input to a machine learning model, a user issue;
identifying a set of response actions associated with the user issue; and
selecting the response action from the set of response actions based on the information about the user's condition and the updated information.

Clause 9. The patient monitoring and treatment method of clause 8, wherein the user issue is a health-related issue.

Clause 10. The patient monitoring and treatment method of clause 1, wherein the non-standardized format comprises at least one of: an electrical waveform, time-stamped sensor data, or unstructured sensor data.

Clause 11. A patient monitoring and treatment system comprising:
a non-transitory computer-readable memory storing computer-executable instructions; and
one or more processors configured to execute the computer-executable instructions to at least:
store information about a user's condition in a standardized format in a set of one or more non-transitory storage devices, wherein the information about the user's condition represents a user activity pattern of a user;
receive sensor data from a plurality of different sensors, wherein individual sensors of the plurality of different sensors provide respective sensor data in a non-standardized format dependent on hardware or software used by the respective sensor;
update, by a computing system comprising one or more computer processors configured to execute specific instructions, the information about the user's condition in the standardized format based on analysis of the sensor data in one or more non-standardized formats to generate updated information about the user's condition in the standardized format, wherein the updated information about the user's condition indicates a change in the user activity pattern of the user;
store the updated information about the user's condition in the set of one or more non-transitory storage devices;
automatically generate, by the computing system, a message comprising the updated information about the user's condition whenever updated information about the user's condition has been stored; and
transmit the message to one or more additional users over a computer network in real time, so that the one or more additional users have immediate access to up-to-date information about the user.

Clause 12. The patient monitoring and treatment system of clause 11, wherein the computer-executable instructions, when executed by the one or more processors, further cause the one or more processors to:
access additional sensor data from at least one of the plurality of different sensors, wherein the additional sensor data is generated at a time after the sensor data is received; and
compare the additional sensor data to the updated information about the user's condition to generate a comparison result, wherein the comparison result indicates a change in the user's condition is outside of an expected threshold, and wherein the message further comprises the comparison result.

Clause 13. The patient monitoring and treatment system of clause 12, wherein the computer-executable instructions, when executed by the one or more processors, further cause the one or more processors to:
determine, based on the comparison result, a user issue associated with the change in the user's condition;
analyze the user issue using a machine learning model to generate a response action; and
execute the response action.

Clause 14. The patient monitoring and treatment system of clause 13, wherein the response action comprises transmitting an instruction to cause a user assistance device to provide a medication to the user.

Clause 15. The patient monitoring and treatment system of clause 11, wherein the computer-executable instructions, when executed by the one or more processors, further cause the one or more processors to:
identify a cohort associated with the user, wherein the cohort is associated with cohort information; compare the updated information to the cohort information to generate a comparison result;
determine, based on the comparison result, the updated information indicates the user's condition is outside of an expected range;
identify a response action based on the comparison result; and execute the response action.

Clause 16. The patient monitoring and treatment system of clause 15, wherein to identify the response action, the computer-executable instructions, when executed by the one or more processors, further cause the one or more processors to:
determine, based on applying the updated information as input to a machine learning model, a user issue;
identify a set of response actions associated with the user issue; and
select the response action from the set of response actions based on the information about the user's condition and the updated information.

Clause 17. The patient monitoring and treatment system of clause 16, wherein the user issue is a health-related issue.

Clause 18. A non-transitory computer-readable medium encoded with instructions executable by a processor, the non-transitory computer-readable medium comprising instructions to:

store information about a user's condition in a standardized format in a set of one or more non-transitory storage devices, wherein the information about the user's condition represents a user activity pattern of a user;

receive sensor data from a plurality of different sensors, wherein individual sensors of the plurality of different sensors provide respective sensor data in a non-standardized format dependent on hardware or software used by the respective sensor;

update, by a computing system comprising one or more computer processors configured to execute specific instructions, the information about the user's condition in the standardized format based on analysis of the sensor data in one or more non-standardized formats to generate updated information about the user's condition in the standardized format, wherein the updated information about the user's condition indicates a change in the user activity pattern of the user;

store the updated information about the user's condition in the set of one or more non-transitory storage devices;

automatically generate, by the computing system, a message comprising the updated information about the user's condition whenever updated information about the user's condition has been stored; and transmit the message to one or more additional users over a computer network in real time, so that the one or more additional users have immediate access to up-to-date information about the user.

Clause 19. The non-transitory computer-readable medium of clause 18, wherein the non-standardized format comprises at least one of: an electrical waveform, timestamped sensor data, or unstructured sensor data.

Clause 20. The non-transitory computer-readable medium of clause 18, wherein a first sensor of the plurality of different sensors is one of: a blood glucose monitor, a blood oxygen sensor, a blood pressure sensor, or a heart rate sensor.

Clause 21. A method comprising:
accessing a user identifier, wherein the user identifier uniquely identifies a user;
accessing, based on the user identifier, user information;
determining, based on the user information, a cohort for the user;
receiving user activity information associated with the user;
generating, based on the user activity information, a user activity pattern, wherein the user activity pattern comprises an expected activity of the user, wherein the expected activity is associated with a time;
receiving, from a sensor, sensor information associated with the user;
determining, based on the sensor information, a current user activity;
comparing the current user activity to the user activity pattern to identify a change in user activity;
responsive to identifying the change in user activity, accessing cohort information for the cohort;
determining, based on the change in user activity, the cohort information, and the user activity information, that the user has experienced a health event; and
generating an alert, wherein the alert comprises a response action associated with the health event.

Clause 22. The method of clause 21 further comprising executing the response action.

Clause 23. The method of clause 21 further comprising selecting the response action from a plurality of response actions associated with a health event type of the health event, and wherein the response action is selected based in part on the user information, the user activity information, and the cohort information.

Clause 24. The method of clause 21 further comprising generating the response action based on applying at least the user activity pattern, the current user activity, a health event type, and the cohort information as input to a machine learning model configured to generate response action options associated with the health event type.

Clause 25. The method of clause 21 wherein generating the user activity pattern comprises:
displaying, via a user interface, a user information request;
receiving, via the user interface, a user response, wherein the user response comprises additional user information;
accessing a machine learning model configured to generate user activity patterns; and
generating, using the machine learning model, the user activity pattern based at least in part on the user response, the user information, the cohort, and the user activity information.

Clause 26. The method of clause 21, wherein generating the alert comprises including in the alert a recipient indicator that identifies a recipient to which the alert should be transmitted, and transmitting the alert to the recipient based on the recipient indicator.

Clause 27. The method of clause 26, wherein transmitting the alert to the recipient comprises transmitting the alert to a caregiver.

Clause 28. The method of clause 21, wherein comparing the current user activity to the user activity pattern to identify the change in the user activity comprises applying the current user activity and the user activity pattern as input to a machine learning model to cause the machine learning model to identify the change, wherein the machine learning model is trained to determine the change indicates a deviation beyond a threshold, and wherein the threshold is determined by the machine learning model based on the user activity pattern to indicate when user activities indicate the user is experiencing a change beyond an expected day-to-day variance.

Clause 29. The method of clause 21 further comprising transmitting, to the sensor, a request for the sensor information.

Clause 30. A user monitoring and interaction system comprising:
a computer-readable memory storing computer-executable instructions; and
one or more processors configured to execute the computer-executable instructions to at least:
access a user identifier, wherein the user identifier uniquely identifies a user;
access, based on the user identifier, user information;
determine, based on the user information, a cohort for the user;
receive user activity information associated with the user;
generate, based on the user activity information, a user activity pattern, wherein the user activity pattern comprises an expected activity of the user, wherein the expected activity is associated with a time;
receive, from a sensor, sensor information associated with the user;
determine, based on the sensor information, a current user activity;
identify a change in user activity based at least in part on a comparison between the current user activity and the user activity pattern;
responsive to identifying the change in user activity, access cohort information for the cohort;
determine, based on the change in user activity, the cohort information, and the user activity information, that the user has experienced a health event; and
generate an alert, wherein the alert comprises a response action associated with the health event.

Clause 31. The user monitoring and interaction system of clause 30, wherein the user monitoring and interaction system further comprises the sensor.

Clause 32. The user monitoring and interaction system of clause 30, wherein the sensor is one of: a location sensor, a temperature sensor, a motion sensor, a presence sensor, or a camera.

Clause 33. The user monitoring and interaction system of clause 30, wherein the sensor is one of: a heartrate monitor, a blood glucose monitor, or a blood pressure monitor.

Clause 34. The user monitoring and interaction system of clause 30 further comprising a user assistance device, wherein the one or more processors are further configured to execute the computer-executable instructions to at least receive, from the user assistance device, user assistance device information, and wherein the current user activity is further determined based on the user assistance device information.

Clause 35. The user monitoring and interaction system of clause 34, wherein the user assistance device is associated with user assistance device instructions, and wherein the user activity pattern is further generated based on the user assistance device instructions.

Clause 36. A non-transitory computer-readable medium storing instructions that, when executed by a computing system cause the computing system to perform operations comprising:
accessing a user identifier, wherein the user identifier uniquely identifies a user;
accessing, based on the user identifier, user information;
determining, based on the user information, a cohort for the user;
receiving user activity information associated with the user;
generating, based on the user activity information, a user activity pattern,
wherein the user activity pattern comprises an expected activity of the user, wherein the expected activity is associated with a time;
receiving, from a sensor, sensor information associated with the user;
determining, based on the sensor information, a current user activity;
identifying a change in user activity based on comparing the current user activity to the user activity pattern;
responsive to identifying the change in user activity, accessing cohort information for the cohort;
determining, based on the change in user activity, the cohort information, and the user activity information, that the user has experienced a health event; and
generating an alert, wherein the alert comprises a response action associated with the health event.

Clause 37. The non transitory computer-readable medium of clause 36, wherein the computer readable medium stores instructions that, when executed, further cause the computing system to perform operations comprising:
receiving, from a computing system, second user activity information associated with a second current user activity, and
wherein the change in user activity is further identified based on comparing the second activity information to the current user activity and the user activity pattern.

Clause 38. The non-transitory computer-readable medium of clause 36, wherein the user identifier comprises at least one of: a user name, an email address, or a password.

Clause 39. The non-transitory computer-readable medium of clause 36, wherein the user information comprises a health record associated with the user.

Clause 40. The non-transitory computer-readable medium of clause 36, wherein the time is one of: a time when the user is expected to eat, a time when the user is expected to sleep, a time when the user is expected to use a bathroom, or a time when the user expected to leave a home.

Clause 41. A patient monitoring and treatment method comprising:
under control of a computing system comprising one or more processors configured to execute specific instructions,
collecting and analyzing sensor data from one or more sensors to determine a user activity pattern of a patient, wherein the user activity pattern comprises an expected activity of the patient;
identifying the patient as at high risk of an in-home health event based on an association of the patient with a cohort, the association of the patient with the cohort determined based on analysis of the user activity pattern and cohort information associated with the cohort; and
administering an appropriate treatment to the patient at high risk of the in-home health event, wherein the appropriate treatment comprises one of: providing an assistance device to the user, providing a medication to the user, or contacting a healthcare provider to assist the user.

What is claimed is:

1. A patient monitoring and treatment method comprising:
storing information about a user condition in a standardized format in a set of one or more non-transitory storage devices, wherein the information about the user condition represents a user activity pattern of a user;
receiving sensor data in one or more non-standardized formats from a plurality of different sensors, wherein individual sensors of the plurality of different sensors provide respective sensor data in a respective non-standardized format of the one or more non-standardized formats dependent on hardware or software used by a respective sensor associated with the respective sensor data;
updating, by a computing system comprising one or more computer processors configured to execute specific instructions, the information about the user condition in the standardized format based on analysis of the received sensor data in the one or more non-standardized formats to generate updated information about the user condition in the standardized format, wherein the updated information about the user condition indicates a change in the user activity pattern of the user;

storing the updated information about the user condition in the set of one or more non-transitory storage devices;

automatically generating, by the computing system, a message comprising the updated information about the user condition whenever updated information about the user condition has been stored; and transmitting the automatically generated message to one or more additional users over a computer network in real time, so that the one or more additional users have immediate access to up-to-date information about the user.

2. The patient monitoring and treatment method of claim 1 further comprising:

accessing additional sensor data from at least one of the plurality of different sensors, wherein the additional sensor data is generated at a time after the sensor data is received; and comparing the additional sensor data to the updated information about the suser condition to generate a comparison result, wherein the comparison result indicates a change in the user condition is outside of an expected threshold, and wherein the message further comprises the comparison result.

3. The patient monitoring and treatment method of claim 2 further comprising:

determining, based on the comparison result, a user issue associated with the change in the user condition;

analyzing the user issue using a machine learning model to generate a response action; and executing the response action.

4. The patient monitoring and treatment method of claim 3, wherein the response action comprises transmitting an instruction to cause a user assistance device to provide a medication to the user.

5. The patient monitoring and treatment method of claim 1, wherein the sensor data comprises first sensor data and second sensor data, wherein the first sensor data is received from a first sensor of the plurality of different sensors, wherein the second sensor data is received from a second sensor of the plurality of different sensors, and wherein the first sensor data and the second sensor data are in different formats.

6. The patient monitoring and treatment method of claim 1, wherein a first sensor of the plurality of different sensors is one of: a blood glucose monitor, a blood oxygen sensor, a blood pressure sensor, or a heart rate sensor.

7. The patient monitoring and treatment method of claim 1 further comprising:

identifying a cohort associated with the user, wherein the cohort is associated with cohort information;

comparing the updated information to the cohort information to generate a comparison result;

determining, based on the comparison result, the updated information indicates the user condition is outside of an expected range;

identifying a response action based on the comparison result; and executing the response action.

8. The patient monitoring and treatment method of claim 7, wherein identifying the response action comprises:

determining, based on applying the updated information as input to a machine learning model, a user issue;

identifying a set of response actions associated with the user issue; and selecting the response action from the set of response actions based on the information about the user condition and the updated information.

9. The patient monitoring and treatment method of claim 8, wherein the user issue is a health-related issue.

10. The patient monitoring and treatment method of claim 1, wherein the one or more non-standardized formats comprise at least one of: an electrical waveform, timestamped sensor data, or unstructured sensor data.

11. A patient monitoring and treatment system comprising:

a non-transitory computer-readable memory storing computer-executable instructions; and one or more processors configured to execute the computer-executable instructions to at least:

store information about a user condition in a standardized format in a set of one or more non-transitory storage devices, wherein the information about the user condition represents a user activity pattern of a user;

receive sensor data in one or more non-standardized formats from a plurality of different sensors, wherein individual sensors of the plurality of different sensors provide respective sensor data in a respective non-standardized format of the one or more non-standardized formats dependent on hardware or software used by a respective sensor associated with the respective sensor data;

update, by a computing system comprising one or more computer processors configured to execute specific instructions, the information about the user condition in the standardized format based on analysis of the received sensor data in the one or more non-standardized formats to generate updated information about the user condition in the standardized format, wherein the updated information about the user condition indicates a change in the user activity pattern of the user;

store the updated information about the user condition in the set of one or more non-transitory storage devices;

automatically generate, by the computing system, a message comprising the updated information about the user condition whenever updated information about the user condition has been stored; and transmit the automatically generated message to one or more additional users over a computer network in real time, so that the one or more additional users have immediate access to up-to-date information about the user.

12. The patient monitoring and treatment system of claim 11, wherein the computer-executable instructions, when executed by the one or more processors, further cause the one or more processors to:

access additional sensor data from at least one of the plurality of different sensors, wherein the additional sensor data is generated at a time after the sensor data is received; and compare the additional sensor data to the updated information about the user condition to generate a comparison result, wherein the comparison result indicates a change in the user condition is outside of an expected threshold, and wherein the message further comprises the comparison result.

13. The patient monitoring and treatment system of claim 12, wherein the computer-executable instructions, when executed by the one or more processors, further cause the one or more processors to:
   determine, based on the comparison result, a user issue associated with the change in the user condition;
   analyze the user issue using a machine learning model to generate a response action; and
   execute the response action.

14. The patient monitoring and treatment system of claim 13, wherein the response action comprises transmitting an instruction to cause a user assistance device to provide a medication to the user.

15. The patient monitoring and treatment system of claim 11, wherein the computer-executable instructions, when executed by the one or more processors, further cause the one or more processors to:
   identify a cohort associated with the user, wherein the cohort is associated with cohort information;
   compare the updated information to the cohort information to generate a comparison result;
   determine, based on the comparison result, the updated information indicates the user condition is outside of an expected range;
   identify a response action based on the comparison result; and
   execute the response action.

16. The patient monitoring and treatment system of claim 15, wherein to identify the response action, the computer-executable instructions, when executed by the one or more processors, further cause the one or more processors to:
   determine, based on applying the updated information as input to a machine learning model, a user issue;
   identify a set of response actions associated with the user issue; and
   select the response action from the set of response actions based on the information about the user condition and the updated information.

17. The patient monitoring and treatment system of claim 16, wherein the user issue is a health-related issue.

18. A non-transitory computer-readable medium encoded with instructions executable by a processor, the non-transitory computer-readable medium comprising instructions to:
   store information about a user condition in a standardized format in a set of one or more non-transitory storage devices, wherein the information about the user condition represents a user activity pattern of a user;
   receive sensor data in one or more non-standardized formats from a plurality of different sensors, wherein individual sensors of the plurality of different sensors provide respective sensor data in a respective non-standardized format of the one or more non-standardized formats dependent on hardware or software used by a respective sensor associated with the respective sensor data;
   update, by a computing system comprising one or more computer processors configured to execute specific instructions, the information about the user condition in the standardized format based on analysis of the received sensor data in the one or more non-standardized formats to generate updated information about the user condition in the standardized format, wherein the updated information about the user condition indicates a change in the user activity pattern of the user;
   store the updated information about the user condition in the set of one or more non-transitory storage devices;
   automatically generate, by the computing system, a message comprising the updated information about the user condition whenever updated information about the user condition has been stored; and
   transmit the automatically generated message to one or more additional users over a computer network in real time, so that the one or more additional users have immediate access to up-to-date information about the user.

19. The non-transitory computer-readable medium of claim 18, wherein the one or more non-standardized formats comprise at least one of: an electrical waveform, time-stamped sensor data, or unstructured sensor data.

20. The non-transitory computer-readable medium of claim 18, wherein a first sensor of the plurality of different sensors is one of: a blood glucose monitor, a blood oxygen sensor, a blood pressure sensor, or a heart rate sensor.

* * * * *